(12) United States Patent
Seifert et al.

(10) Patent No.: US 7,483,610 B2
(45) Date of Patent: Jan. 27, 2009

(54) OPTICAL FIBER HAVING REDUCED DEFECT DENSITY

(75) Inventors: Martin Seifert, West Simsbury, CT (US); Upendra H. Manyam, Weatogue, CT (US); Mansoor Alam, Rocky Hill, CT (US); Kanishka Tankala, South Windsor, CT (US); Jaroslaw Abramczyk, New Britain, CT (US); Douglas Guertin, Charlton, MA (US); Nils Jacobson, North Granby, CT (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 11/121,501

(22) Filed: May 3, 2005

(65) Prior Publication Data

US 2005/0254765 A1 Nov. 17, 2005

Related U.S. Application Data

(60) Provisional application No. 60/567,534, filed on May 3, 2004.

(51) Int. Cl.
*G02B 6/02* (2006.01)
(52) U.S. Cl. .................. 385/123; 385/124; 385/125; 385/126; 385/127
(58) Field of Classification Search .......... 385/123–127
See application file for complete search history.

(56) References Cited

U.S. PATENT DOCUMENTS

| | | | |
|---|---|---|---|
| 4,473,273 | A | 9/1984 | Hodge |
| 4,511,209 | A | 4/1985 | Skutnik |
| 4,707,076 | A | 11/1987 | Skutnik |
| 4,815,079 | A | 3/1989 | Snitzer |
| 4,852,969 | A | 8/1989 | Babirad |

(Continued)

FOREIGN PATENT DOCUMENTS

WO WO 99/30391 A1 6/1999

OTHER PUBLICATIONS

Skutnik, "Hard Plastic Claddings: Nearing Two Decades of Performance", Chapter 9, American Chemical Society Symposium Series 795, edited by Julie P. Harmon and Gerry K. Noren, 2001.
3M Power-Core Fiber Products Catalog, dated 1995, No. 78-6900-3459-6, Revision A.
Specialty Fiber Technologies Catalog from Lucent Technologies, 2001.

(Continued)

*Primary Examiner*—Jennifer Doan
(74) *Attorney, Agent, or Firm*—Peter J. Rainville

(57) ABSTRACT

An optical fiber comprising a multimode glass core having a diameter of at least 250 microns and an index of refraction and a polymer cladding having a thickness and contactingly surrounding a glass portion of the fiber so as to define an interface between the glass portion and the polymer cladding. The polymer cladding can have a first index of refraction that is less than the index of refraction. The fiber can comprise a density of less than 0.25 non-conforming regions having a diameter of 25 microns or greater per millimeter of length along the fiber, where each of the non-conforming regions is a region visible to the human eye under an optical microscope and having at least a portion thereof within a selected distance of the interface. The selected distance can be less than or equal to the thickness of the polymer cladding. The optical microscope can have a total magnification of about 200. The polymer cladding can be applied to at least a part of the optical fiber in at least a class 1000 environment. Methods of using optical fibers, including receiving with an optical fiber optical energy from a source and guiding the optical energy with the optical fiber, wherein the optical energy comprises at least one of 1) pulses each comprising a peak power of at least 10 kW, 2) an average power of at least 50 Watts, or 3) an average power density of at least 2.9 kW/cm$^2$.

14 Claims, 12 Drawing Sheets

U.S. PATENT DOCUMENTS

| | | |
|---|---|---|
| 4,884,866 A | 12/1989 | Hashimoto |
| 5,203,896 A | 4/1993 | Neuberger |
| 5,298,047 A | 3/1994 | Hart, Jr. |
| 5,302,316 A | 4/1994 | Hashimoto |
| 5,418,881 A | 5/1995 | Hart, Jr. |
| 5,533,163 A | 7/1996 | Muendel |
| 5,644,670 A | 7/1997 | Fukuda |
| 5,690,863 A | 11/1997 | Schuman |
| 5,864,645 A | 1/1999 | Zellmer |
| 5,873,923 A | 2/1999 | DiGiovanni |
| 5,949,941 A | 9/1999 | DiGiovanni |
| 5,966,491 A | 10/1999 | DiGiovanni |
| 6,018,533 A | 1/2000 | Krivoshlykov |
| 6,115,526 A | 9/2000 | Morse |
| 6,118,575 A | 9/2000 | Grubb |
| 6,157,763 A | 12/2000 | Grubb |
| 6,477,307 B1 | 11/2002 | Tankala |
| 6,483,973 B1 | 11/2002 | Mazzarese |
| 6,606,441 B2 | 8/2003 | Irie |
| 6,687,046 B2 | 2/2004 | Leplingard |
| 6,950,586 B2 | 9/2005 | Po |
| 6,954,575 B2 * | 10/2005 | Fermann et al. ............. 385/128 |
| 7,215,858 B2 | 5/2007 | Po |
| 2002/0159671 A1 * | 10/2002 | Boyd et al. ................... 385/12 |
| 2005/0265678 A1 | 12/2005 | Manyam |
| 2005/0271347 A1 | 12/2005 | Kimball |

OTHER PUBLICATIONS

Sumitomo website pages, printed Apr. 2, 2003.
Hunter et al.; "Selecting a High-Power Fiber-Optic Laser Beam Delivery System"; Laser Institute of America, Proceedings ICALEO 81E, pp. 173-182, 1996.
Hunter et al.; "Designing a fiber-optic beam delivery system"; Proc. SPIE vol. 2993, p. 168-179; 1997.
Dawson et al.; "Large flattened mode optical fiber for high output energy pulsed fiber lasers"; CLEO 2003, Jun. 3, 3.30-3.45, CWD5.
Proposal to (redacted) Corporation, "Delivery Fiber for . . . Laser", prepared by Nufern, Feb. 2003.
Ghatak et al.; "Design of Waveguide Refractive Index Profile to Obtain Flat Modal Field"; SPIE vol. 3666, pp. 40-44 (1998).
DSM Desotech, Product Data Sheet, DeSolite 3471-1-152A.

* cited by examiner

Intensity

Beam Radius

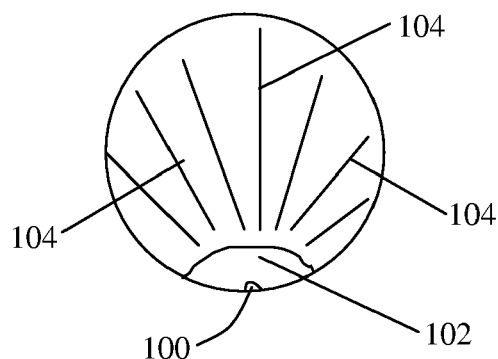
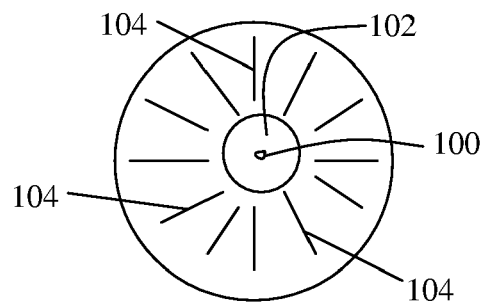
FIG. 5A  FIG. 5B
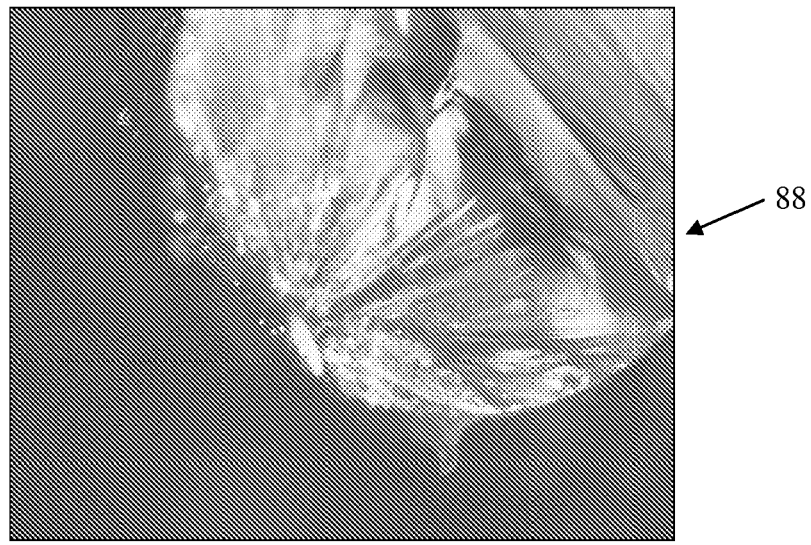
FIG. 6
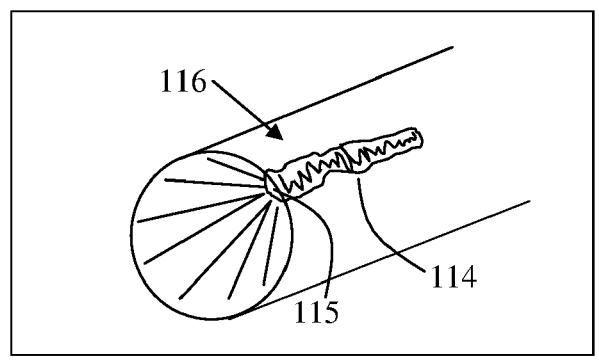
FIG. 7

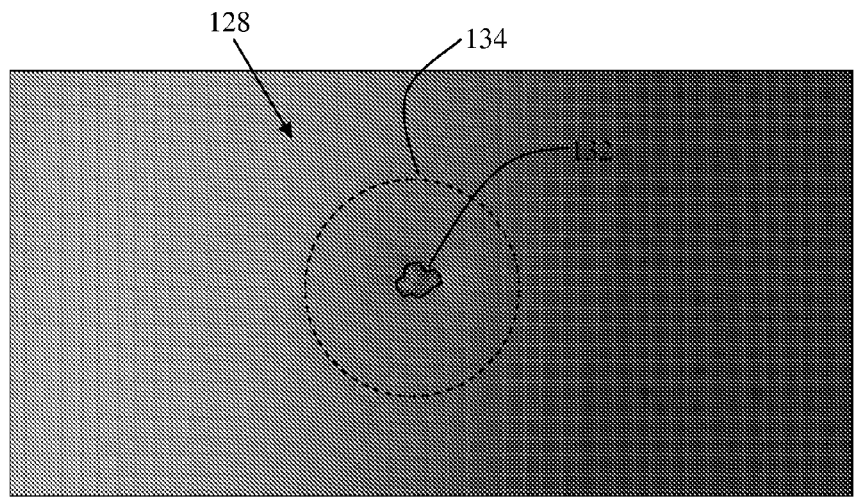
FIG. 8A
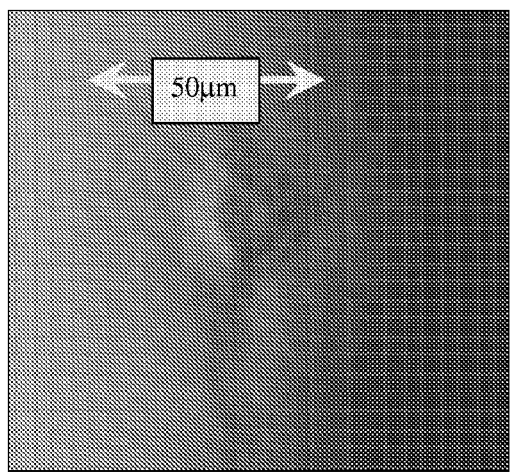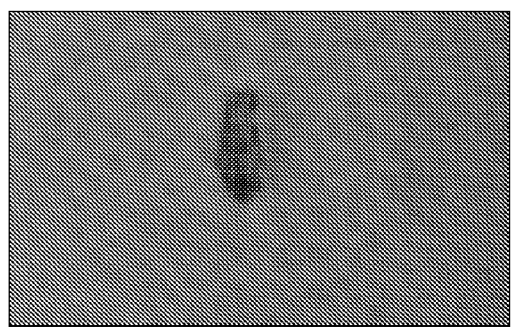
FIG. 8B  FIG. 8C

OPTICAL FIBER HAVING REDUCED DEFECT DENSITY

CROSS-REFERENCE TO RELATED APPLICATION

This application claims priority to provisional patent application 60/567,534, filed May 3, 2004 and entitled "Optical Fiber Having Reduced Defect Density", and which is herein incorporated by reference.

FIELD OF THE INVENTION

The present invention relates to optical waveguides, and more particularly, to optical fibers, methods of making optical fibers, and to apparatus and systems using optical fibers.

BACKGROUND OF THE INVENTION

Optical fibers are often used to deliver optical energy from an energy source to a work object or from a work object to a receiving apparatus. The optical energy can be used, for example, for imaging, illuminating, measuring or modifying the work object. In many applications the energy source is a laser and the optical fiber delivers laser light to the work object. For example, in an industrial setting a high power laser, such as a Nd YAG laser, can be used for cutting and/or welding, and an optical fiber can deliver the light from the Nd YAG laser to, for example, an automotive body for welding a seam on the body. Typically, a robotic arm moves one end of the optical fiber about for welding along the seam. As another example, in a medical setting an alexandrite laser can be used to remove unwanted hair from the body of a patient. Again an optical fiber delivers the light from the alexandrite laser to the patient. A physician can grasp one end of the fiber and direct light to a particular region of the patient's body. In yet a further example, an optical fiber can deliver light to a gaseous work object for performing, for example, Raman spectroscopy on the object. In this instance a detector and a receiver are used for analyzing light reflected from or transmitted through the work object, and an optical fiber can also deliver the reflected or transmitted light to the detector and/or receiver. The foregoing are merely three examples; many others exist.

Unfortunately, although many fibers are available in the art, it is not unknown for a fiber to fall short of meeting one or more of the performance criteria that can be relevant in a particular application. In many instances, a compromise is made in the design of a fiber wherein one performance characteristic is reduced to ensure higher performance according to another characteristic.

Accordingly it is an object of the present invention to provide an improved optical fiber that addresses one or more of the deficiencies or drawbacks of the prior art.

SUMMARY OF THE INVENTION

In one aspect of the invention, Applicants have discovered the cause or causes of fiber failures, described more in the Detailed Description below, and provide an optical fiber, and methods for providing and/or using such a fiber, that are adapted to reduce or eliminate the incidence of such failures. In one practice of the invention, such a fiber comprises a reduced density of non-conforming regions, which regions are understood to be a cause of the aforementioned fiber failures.

BRIEF DESCRIPTION OF THE DRAWINGS

FIG. 5A schematically illustrates the signature left on a cross sectional surface of a fiber when a surface flaw causes the fiber to fracture;

FIG. 5B schematically illustrates the signature left on a cross sectional surface of a fiber when an interior flaw causes the fiber to fracture;

FIG. 6 is a high quality photocopy of one end of the glass core of a failed fiber analyzed by the Applicants, showing a signature similar to that of FIG. 5A;

FIG. 7 schematically illustrates additional detail of the failed fiber shown in FIG. 6;

FIGS. 8A-8L are high quality photocopies illustrating various examples of non-conforming regions found in prior art fibers used for the delivery of laser power from a medical laser to a patient;

Not every component is labeled in every one of the foregoing FIGURES, nor is every component of each embodiment of the invention shown where illustration is not considered necessary to allow those of ordinary skill in the art to understand the invention. FIGURES are schematic and not necessarily to scale.

When considered in conjunction with the foregoing FIGURES, further features of the invention will become apparent from the following detailed description of non-limiting embodiments of the invention.

DETAILED DESCRIPTION

Figure 1:
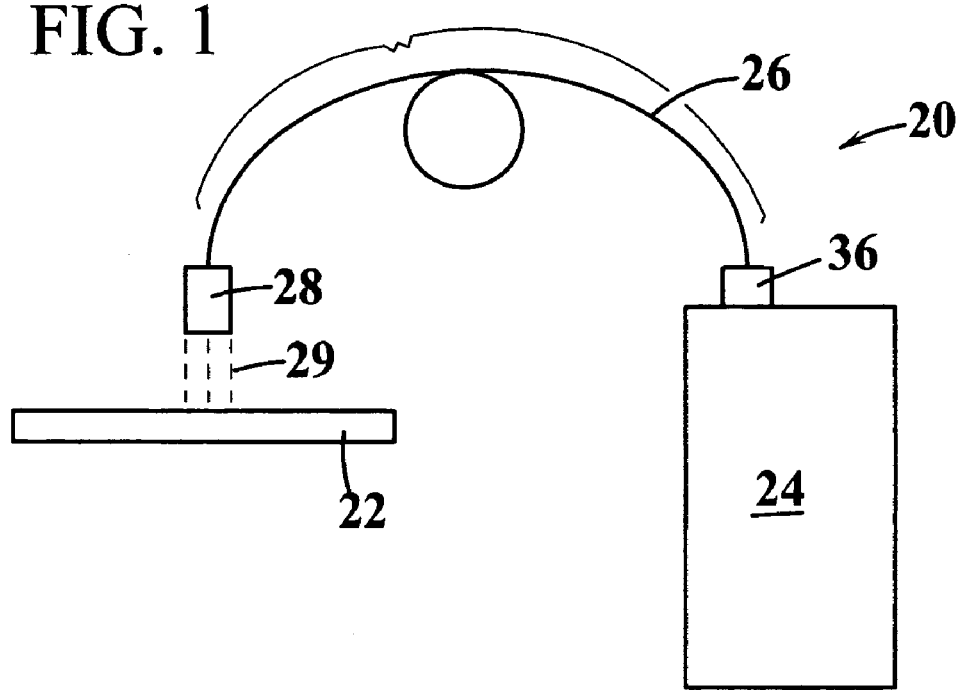
FIG. 1 illustrates an optical apparatus, including an optical delivery fiber, for delivering optical energy to or from a work object.

FIG. 1 illustrates a conventional optical apparatus 20, which can be used, for example, for imaging, illuminating, modifying or measuring a work object 22, and which can include an optical fiber according to the invention. The apparatus 20 includes a light source 24, such as a laser, and an optical fiber 26 for delivering light from the light source 24 to the work object 22. An optical element 28, such as, for example, a collimator or an assembly of lenses, conditions the light guided by the optical fiber 26 so as to provide light beam 29 having selected characteristics (e.g., collimated to a certain beam diameter or focused to a particular spot size) to the work object 22. The length of the optical fiber 26 can range from tens or hundreds of meters, such as in an industrial setting, to a few meters, such as in a medical environment. In other applications even shorter lengths of the fiber 26 are appropriate. In an industrial environment the light source 24 can be a continuous wave (CW) Nd YAG laser having an output wavelength of about 1.064 nm and the work object 22 can be an automotive part that is being welded or cut by the light beam 29. In this instance a robotic arm typically moves the optical element 28 about a work area for welding or cutting work objects and various portions of work objects. In a medical environment the light source can be a pulsed alexandrite laser providing pulses having a fundamental wavelength of about 755 nm for removing unwanted hair from a patient. In this instance a physician grasps the optical element 28 and manually directs the light beam 29 to the proper work area. The fiber 26 can be repeatedly moved about and bent when in use. For example, a physician performing a hair removal procedure typically bends the fiber about his or her shoulder and downwardly directs the light beam 29 onto a prone patient.

The foregoing are merely two examples where an optical apparatus and/or optical fiber of the present invention can be useful. Many more exist. For example, optical apparatus such as that schematically illustrated in FIG. 1 can be used in the following applications: industrial materials processing applications in addition to cutting and welding (e.g., drilling, marking, and heat treating); medical applications in addition to hair removal, such as providing a laser scalpel, welding tissue, photo-dynamic therapy and drilling for dentistry; laser trimming of semiconductor component values; spectroscopic detection of trace gases, heavy metals, or biowarfare agents; screening explosives; detecting mines; soldering and brazing; high speed printing; large scale RGB projection systems; ultraviolet (UV) lithography; direct-writing of photoresist for the manufacture of printed circuit boards (PCB's); and drilling vias in PCB's. The foregoing list is merely exemplary, as other applications exist for the apparatus shown in FIG. 1. Source 24 and work object 22 can be a transmitter and receiver for communicating information therebetween.

Figure 2:
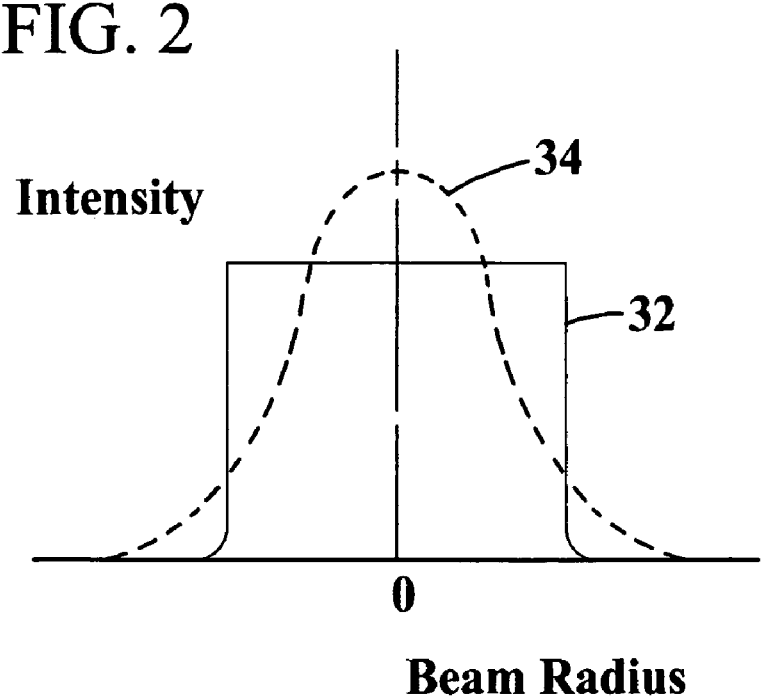
FIG. 2 schematically illustrates two optical beam profiles, namely a Gaussian profile and a top hat profile, which can be delivered by the optical fiber of FIG. 1.

FIG. 2 schematically illustrates a plot of the intensity of the optical beam 29 versus radial distance for one diameter across the optical beam 29 in a conventional system. In many applications it is desirable to illuminate the work object 22 with a "top hat" intensity profile, as indicated by reference the numeral 32, rather than with the more Gaussian profile indicated by reference numeral 34. If the optical fiber 26 is a multimode fiber and is sufficiently long, the modes propagating along the optical fiber 26 can, in certain circumstances, naturally mix or scramble such that the optical fiber 26 propagates a top hat or more nearly top hat optical beam intensity profile. However, if the length of the optical fiber 26 is shorter, such natural mode mixing may not be adequate. One technique known in the art is to incorporate a stress element in the connector 36 that connects the optical fiber 26 to the light source 24. This stress element can be a cable that is wrapped around a selected length of the optical fiber 26 for imposing appropriate stress upon the optical fiber 26.

Figure 3:
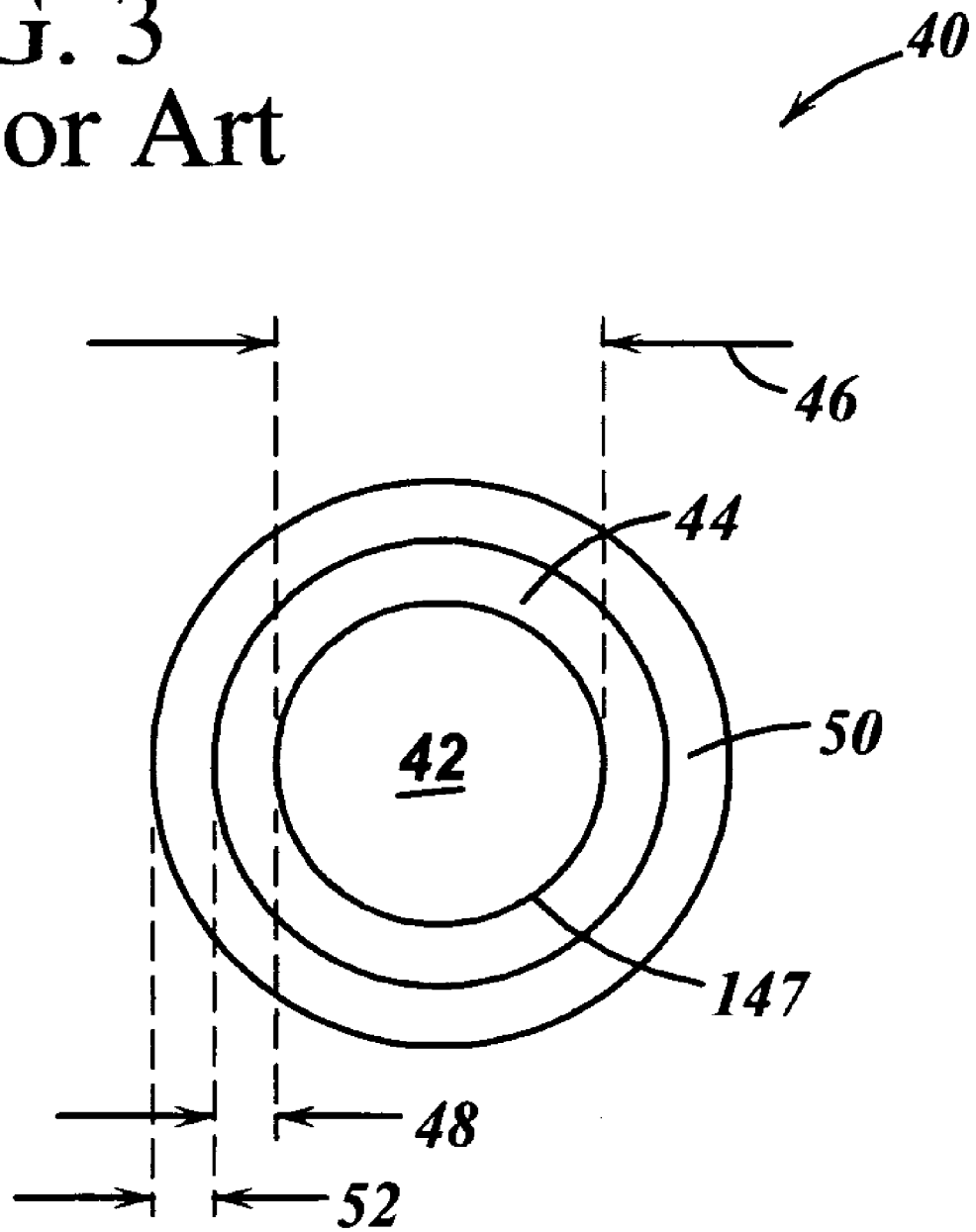
FIG. 3 schematically illustrates a cross section of an optical fiber known in the prior art and that can be used with the apparatus shown in FIG. 1.

FIG. 3 schematically illustrates a cross section of an optical fiber known in the prior art and that can be used as the optical fiber 26 in a prior art apparatus similar to the apparatus 20 shown in FIG. 1. The optical fiber 40 includes a core 42, which is typically silica, having a diameter, as indicated by reference numeral 46, of approximately 1500 microns. A cladding 44 surrounds the core 42 and comprises an index of refraction that is less than the index of refraction of the core 42. Typically, the cladding 44 comprises a hard polymer, which can have an index of refraction low enough to provide a numerical aperture (NA) of 0.35 or greater relative to silica. Some discussion of the concept of NA may be useful.

The NA of an optical fiber is a measure of the "acceptance angle" of the fiber. The fiber can guide light that enters the end of the core of the fiber within this acceptance angle; light that enters the end of the fiber at an angle that is larger than the acceptance angle can be lost, such as by escaping into the cladding. Thus the end of a fiber can be imagined to have a cone emanating therefrom. Light that enters in a direction that is within the cone will propagate along the fiber. Light outside the cone will not propagate. The larger the NA, the wider the cone. In many applications it is advantageous for an optical fiber to have a high NA. For example, medical and industrial lasers typically provide rather high powers and use an optical fiber to deliver light energy from the laser to a work object. The flexibility, low weight, and relatively small dimensions of an optical fiber provide considerable advantages for directing the light from the high power laser to the work object. However, such high power sources often provide an output beam that has less than optimal beam quality. Such beams can be divergent and/or difficult to focus. A higher NA allows the fiber to capture more of the light launched onto an end face of the fiber from the high power source. Less light is lost, thereby increasing the efficiency of the overall optical apparatus. Also, the higher NA reduces the potential for damaging the fiber, as any power that is lost is typically absorbed by the cladding(s) of the fiber, resulting in considerable heat dissipation that can damage the cladding(s).

One mathematical formula for the NA of a first region of a waveguide relative to a second region of a waveguide takes the square root of the difference of the squares of the indices of refraction of two regions:

$$NA=[(1^{st}\text{ region index of refraction})^2-(2^{nd}\text{ region index of refraction})^2]^{1/2}$$

As understood by one of ordinary skill in the art, the foregoing formula is most accurate for a step index fiber, and for other fibers a different formula or actual measurements may be appropriate, but the foregoing formula is generally qualitatively accurate in that it indicates a larger index difference between two regions provides a larger NA. As one example where a different formula is appropriate, known in the art are certain types of fibers wherein the cladding or core comprises more than a single index of refraction, that is, the index of refraction is not constant throughout the core or cladding, such as in a fiber comprising a graded index core. As other examples, known in the art are microstructured or holey fibers or other fibers that are based on photonic bandgap phenomena or that have regions of different index of refraction that are arranged so as to produce an average index of refraction.

Glass is an excellent cladding material that can handle high power without damage. Unfortunately, glass clad fibers having a silica core are typically not available with a NA higher than about 0.22. Most glass clad fibers having a silica core are drawn from a preform having a silica core rod placed inside of a commercially available silica tube that has been highly "down doped" with fluorine to reduce the index of refraction of the tube. Fluorine is a well known "down dopant" that reduces the index of refraction of a silica cladding. However, the amount of fluorine that can be incorporated into a glass tube, and hence the NA of the resultant drawn fiber, is eliminated. Although it is possible to increase the NA of the fiber by up doping the core (e.g., incorporating germanium, aluminum, phosphorus, etc., dopants into the core), this is often undesirable, as these dopants increase the attenuation of light, and accordingly, a pure silica core is typically preferred for the transmission of high power with minimal loss.

Plastic claddings, such as, for example, claddings that comprise fluorinated or perfluorinated polymers, are relatively easily applied to glass fiber and are very desirable because they can provide in many instances an increased NA. "Hard polymers", such as polymers used on the Hard Clad Silica (HCS) optical fiber available from the Optical Fiber Systems division of Furukawa Electric (OFS) and the TECS polymer available from the 3M Company, are known in the art. For example, the foregoing HCS and TECS polymers are, according to their respective manufacturers' data sheets, capable of providing a NA of greater than 0.35 relative to a pure silica glass core. Hard polymers are well known in the art and are reviewed in an article entitled "Hard Polymer Claddings: Nearing Two Decades Of Performance", by Bolesh J. Skutnik, and published as Chapter 9 of the American Chemical Society Symposium Series 795, entitled "Optical Polymers, Fibers and Waveguides", edited by Julie P. Harmon and Gerry K. Noren, 2001. The foregoing Skutnik article is incorporated by reference herein to the extent necessary to understand the present invention.

With reference again to FIG. 3, the cladding 44 typically comprises a hard polymer and has a thickness, indicated by reference numeral 48, of approximately 25 microns. A buffer 50, having a thickness, indicated by reference numeral 52, of approximately 25 microns, can surround the plastic cladding 44. The buffer 50 can be a Tefzel (a well known fluorine-based thermoplastic) buffer. The cladding 44 comprising a hard polymer is typically added to the fiber 40 using a die coater mounted on a draw tower on which the fiber 40 is being drawn. Typically the polymer is cured using appropriate actinic radiation, such as ultraviolet (UV) light provided by an apparatus mounted on the draw tower. The foregoing dimensions for thickness and diameters are exemplary, and as is known in the art a wide variety of fibers having various thicknesses and diameters are available.

In one specific prior art fiber, the cladding 44 comprises TECS material, available from the 3M Company, described in the 3M Power Core Fiber Products Catalog, dated 1995, No. 78-6900-3459-6, Revision A. The TECS material described in the aforementioned catalog is to the Applicants' knowledge still very popular and in wide use, and, as stated in the catalog, has been available since 1988. The TECS coating can contactingly surround the core 42 of the fiber 40, as shown in FIG. 3, or can be an outer cladding that contactingly surrounds an inner cladding (not shown in FIG. 3), that in turn contactingly surrounds the core 42. In this instance, the inner cladding has an index of refraction that is less than the index of refraction of the core 42 and the outer cladding has an index of refraction that is less than the index of refraction of the inner cladding. TECS coatings are described at least on pages 1-3 and 6-7 of the aforementioned catalog. In one instance the fiber 40 can be 3M part no. FT-1.5-UMT (High OH), described in the table on pages 2-3 of the catalog.

In another specific prior art fiber, the cladding 44 comprises the "HCS" material available from Spectran Corporation of Avon Conn. and Sturbridge Mass., (now part of the OFS division of Furukawa). See, for example, the HCS fibers described in the 2001 Specialty Fiber Technologies Catalog from Lucent Technologies (Lucent Technologies purchased Spectran). Pages 44-52 of the foregoing catalog describe multimode step index fibers, which are described in other sections of the catalog as well. More specifically, the prior art fiber 40 shown in FIG. 3 can be Spectran part no. HCP-M1500T (Low OH).

Prior art polymer or plastic clad fibers, and in particular the foregoing prior art TECS and HCS optical fibers, are extremely popular and have found many uses in the industry. However, in certain instances such fibers are prone to failure. For example, the present Applicants analyzed fiber used by an established laser manufacturer who has experienced repeated failures of the foregoing fibers, either under test (after the fibers had been assembled into expensive probes) or in the field when the fibers (again after assembly into a probe) were being used by physicians on patients. For the last several years, five to ten percent of the fibers provided with a laser apparatus, such as the apparatus 20 schematically illustrated in FIG. 1, have been failing, typically early in the expected lifetime of the fiber probe. The failures can be rather catastrophic: the fiber can explode loudly and is severed at the site of the explosion. When used in the field, such catastrophic failure startles both the physician and patient. The fiber typically explodes at a bend in the fiber. Because the physician typically drapes the fiber over his or her shoulder, the loud explosion occurs right next to the physician's ear and can singe or burn the physician's clothes, and does not make the best of impressions on the patient. According to the prior art wisdom, such failures could simply not be prevented, and were ascribed to a variety of potential causes, such as "excessive" power being carried by the fiber or to bending the fiber through a radius that was "too small". Accordingly, the laser manufacturer, who consulted with fiber manufacturers, continues to suffer under a long-standing problem without a solution. The laser manufacturer introduced more rigorous test procedures in an attempt to screen out fibers that would fail in the field. Such testing may be an improvement, but does not screen out all fibers that will fail in the field, and is time consuming and laborious, in addition to requiring that the fiber be assembled into a full probe. Probe is used herein to mean a fiber that has been "connectorized" so as to include an input connector, such as the connector 36 shown in FIG. 1, and an output element, such as the element 28 shown in FIG. 1. In addition a fiber that has been assembled into a probe typically also includes upjacketing to further strengthen the fiber. For example, a nylon tube may be slipped over the Tefzel buffer layer.

The Applicants analyzed samples of failed fibers, as well as new or "virgin" fiber that had not guided optical energy, and discovered the cause of the failure of fibers. Accordingly, in one aspect of the present invention, fibers are adapted to avoid such failures. Applicants' analysis and study are now described in more detail.

A. Observations

Figure 4:
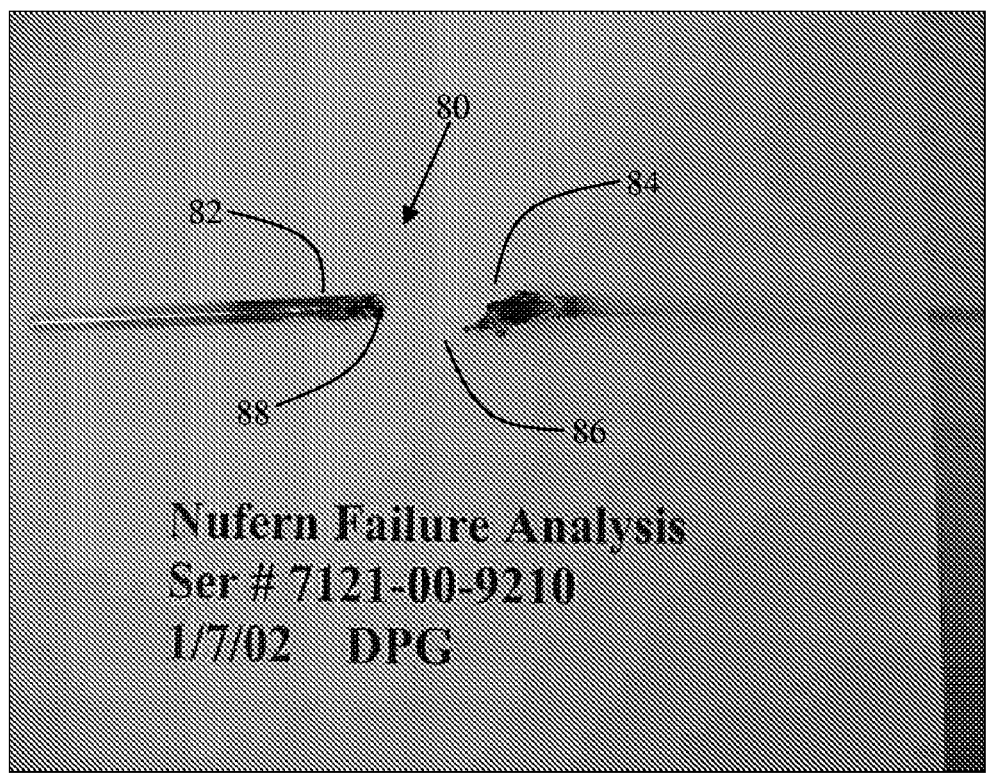
FIG. 4 is a high quality photocopy of a prior art failed fiber analyzed by Applicants.

FIG. 4 is a high quality photocopy of one of the prior art failed fibers 80 analyzed by Applicants. Note that the fiber 80 is completely severed such that a first end 82 of the fiber 80 is separated from a second end 84 of the fiber 80. FIG. 4 clearly indicates that the fiber fails in a catastrophic and violent manner. The ends 82 and 84 are both blackened. As indicated by reference numeral 86, the nylon tube used as an upjacket appears to have melted. The sample shown in FIG. 4 is representative of other samples examined by the Applicants.

Applicants analyzed several samples, including failed samples, as well as at least one "virgin" sample that was not assembled into a probe and hence had not yet failed. Certain flaws can cause glass to fracture in a fairly well understood and predicable manner that leaves a "signature" that such flaws were the cause of the failure. For example, fracture due to a flaw in the glass can leave a signature "mirror" region surrounding the flaw with hackles emanating from the outer boundary of the mirror region and converging in a direction toward the flaw. See FIGS. 5A and 5B, schematically illustrating flaws 100, the mirror regions 102, and hackles 104. FIG. 5A illustrates a flaw 100 that is located at the surface of the fiber. FIG. 5B illustrates a flaw located in the middle of the fiber. Study of these signatures can allow determination of the size and location of the flaw, as well as of the stress at which failure occurs. As an example, in certain instances the size of a flaw 100 is roughly one-tenth of the radius of the mirror region 102. Such signatures were found and analyzed by the Applicants and are described here.

FIG. 6 is a high quality photocopy of one end face 88 of the glass core of the severed fiber of sample FIG. 4. Applicants discovered numerous extended hackles, which can be seen in FIG. 6. Significantly, as Applicants also discovered, the mirror region and hackles indicate that a flaw at the surface of the core caused the failure. The mirror is estimated to have a radius of approximately 150 µm, allowing an estimation of the flaw size to be on the order of 15 µm. The stress at which the fiber failed can be estimated to be about 60 kpsi. (See the formulas described in conjunction with FIG. 10B below.)

Further inspection of the outer surface adjacent to the end face 88 shown in FIG. 6 revealed an important surface feature. As schematically illustrated in FIG. 7, a small strip 114 of the surface glass, resembling a molten furrow, appeared to have been removed. Significantly, the surfaces/edges of this small strip 114 were smooth, indicating that the strip was heated above the glass softening temperature. The strip 114 aligned perfectly with the flaw and mirror region, as is also shown by reference numeral 116 in FIG. 7, indicating that the molten furrow is co-located with the surface flaw that caused the break shown in FIG. 6.

It was not possible to align the severed ends of the sample shown in FIG. 4 in a manner that allowed the ends of the core of the fiber to contact each other. When the ends of the nylon tubing were aligned, the ends of the core remained separated. The nylon tubing either permanently deformed during failure of this fiber, or more likely, pieces of glass are missing from the failure regions of the fiber due to the violent nature of the failure of the fiber. The latter scenario is highly likely, in part because examination of the other end of the failed region did not reveal a signature that matched that shown in FIG. 6 above. The other end of the severed region includes a much larger mirror region and only faint hackles. Significantly, however, the mirror and hackles that are present indicate that a flaw was present at the surface of the core of the fiber.

The glass core, HCS or TECS cladding and Tefzel buffer of the samples (failed and virgin) were probed using an appropriate power microscope and focusing the microscope to probe different distances. Significantly, a high concentration of non-conforming regions, e.g., regions having a different color or being darker or lighter than what appeared to be the norm for that portion of the fiber being examined. The non-conforming regions were often near the interface between the cladding and the Tefzel and/or in the cladding. The non-conforming regions could include fiber or particulate matter and/or a region where the cladding appeared to be chemically changed. Often the chemically changed region surrounded the foreign particle or fiber. Particulate matter was identified in some cases by its darker color and/or by a cross-section that changes size as the focal length of the microscope is varied.

Non-conforming regions are typically visible to the human eye using a microscope, such as an Olympus DX 60F5 or equivalent. Top or backfield illumination can be used, with the illumination provided by a standard white tungsten-halogen light. Non-conforming regions were typically visible using 10× or 20× standard eyepieces and a total magnification of about 200. Photographs were made using the standard Olympus internal camera. It is estimated that about one fourth of the cross section of the fiber is visible, based on the magnification and the depth of field, such that a density of non-conforming regions per unit length is obtained by multiplying the observed number of non-conforming regions by four and dividing by the fiber length that was observed. A reticule allowed estimation of the size of a non-conforming region.

FIG. 8A is a high quality photocopy of a non-conforming region 128 that includes a particle 132. The dotted line 134 encircles the particle and approximates the outer perimeter of the non-conforming region. The diameter of the particle 132 is estimated to be 25 µm. Varying the focal length of the microscope indicated that the particle is very near or at the interface of the polymer cladding and the Tefzel buffer. The diameter of the dotted circle 134 exceeds 100 µm. The non-conforming region can be caused by contamination such as, for example, by the particulate matter and/or subsequent heating of the region around the particulate matter due to absorption of light.

Figure 8D:
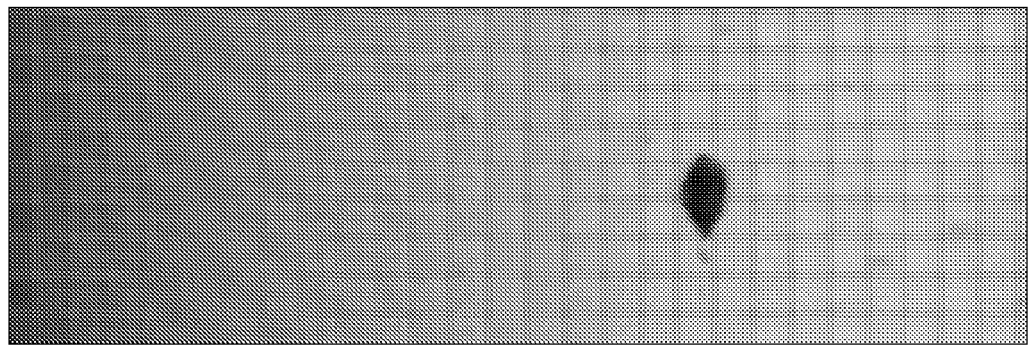
Figure 8E:
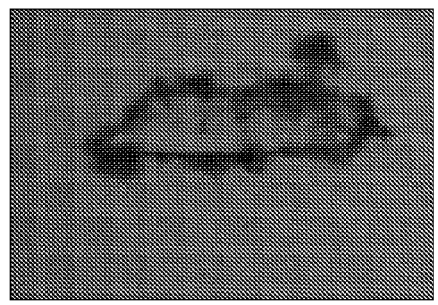
Figure 8F:
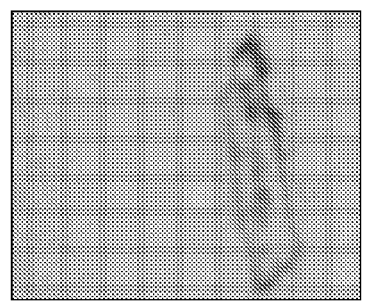
Figure 8G:
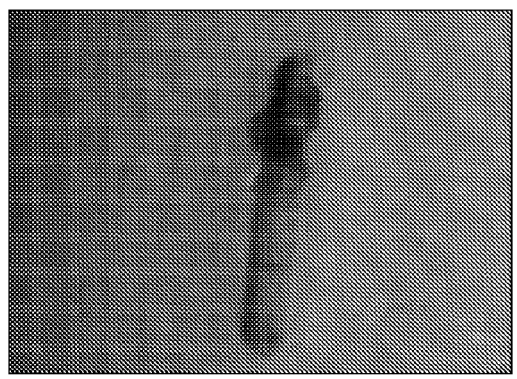
Figure 8H:
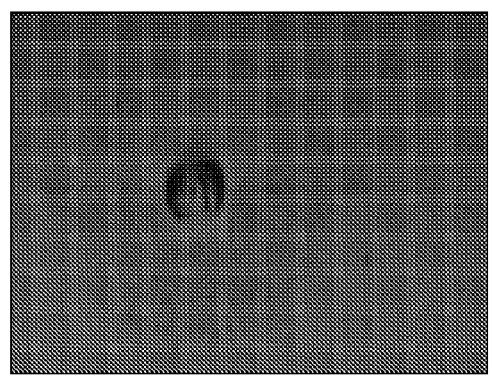
Figure 8I:
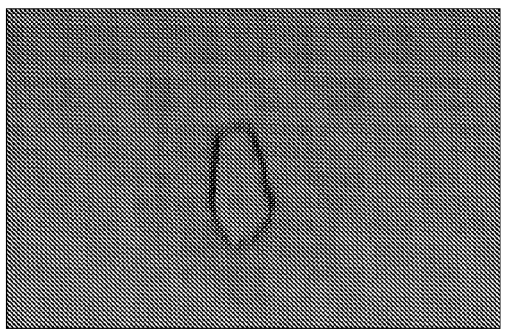
Figure 8J:
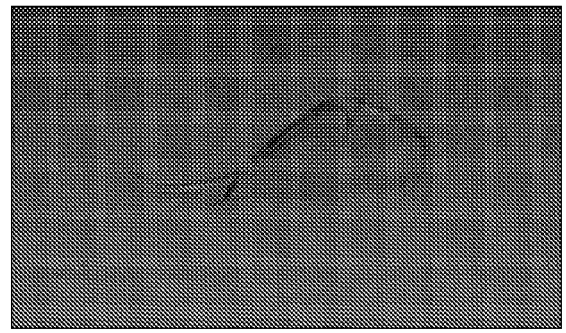
Figure 8K:
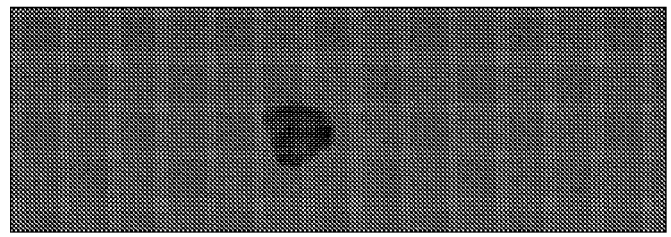
Figure 8L:
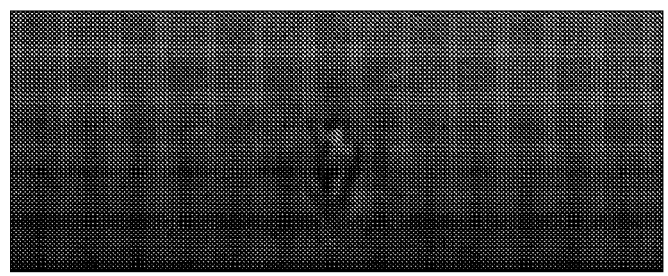

FIGS. 8B-8L are high quality photocopies of additional non-conforming regions found and photographed in the samples evaluated. FIG. 8B also includes an indication of the length of 50 microns, which can be used with all of the FIGS. 8A-8L to estimate the size of the non-conforming regions. Many non-conforming regions in addition to those shown in FIGS. 8A-8L were photographed. As can be seen in FIGS. 8A-8L, the non-conforming regions have diameters ranging from 10 µm to over 100 µm. Many clearly include particulate matter, some of which is fibrous. Many include a non-conforming ring or other area that is most likely due to chemical modification of the cladding.

Several observations are significant. The non-conforming regions often have a diameter that is in excess of the thickness of the hard HCS or TECS cladding (25 microns). Often the non-conforming region includes particulate matter that has a diameter in excess of the thickness of the cladding, such that it is highly likely that some of the particles contact the glass core of the fiber. Secondly, the non-conforming regions were present in samples that failed when in use and which have been damaged by laser radiation, as well as in the virgin sample that has never been assembled into a delivery fiber probe and hence has not propagated laser radiation. The presence of non-conforming regions in the virgin sample as well as in the failed samples indicates that the non-conforming regions are not induced in the cladding during failure of the fiber, but are present prior to failure. Finally, the measured non-conforming region density is rather high. Simple calculations based on Applicants' observations yielded a non-conforming region density ranging from 0.3 to 0.6 non-conforming regions per millimeter. Each fully assembled fiber probe includes a two meter length of fiber. Accordingly, each assembled fiber probe can include hundreds of non-conforming regions.

Figure 9:
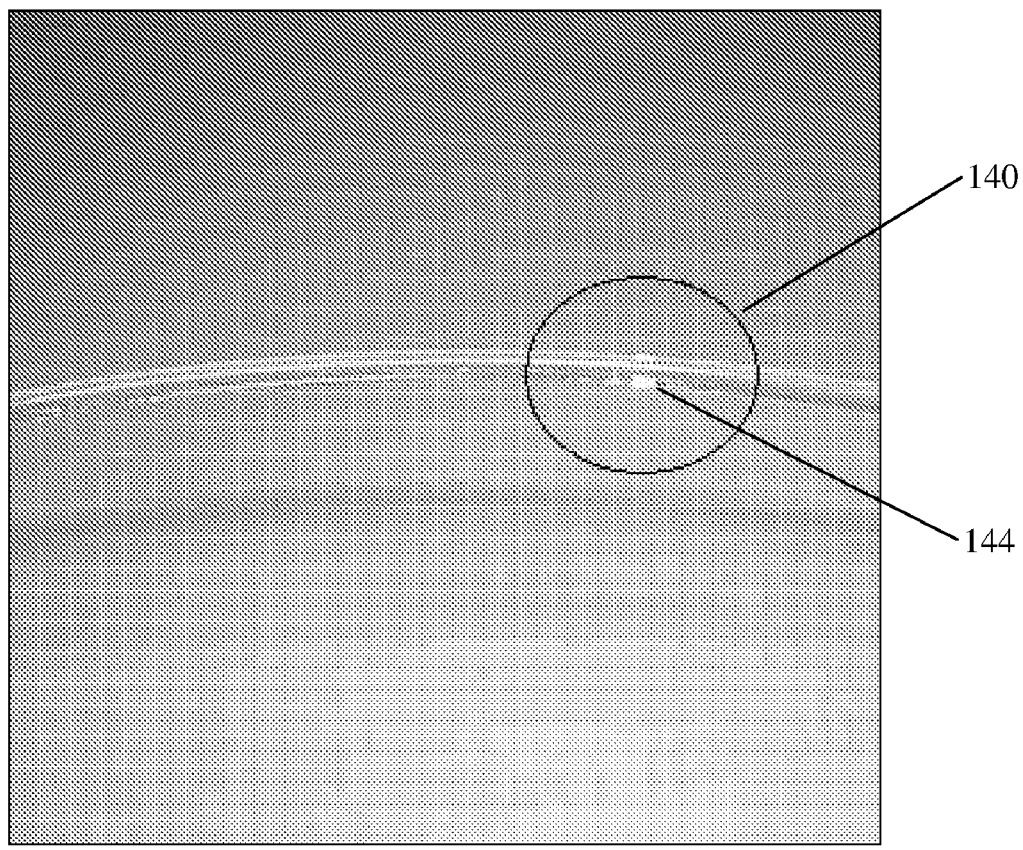
FIG. 9 is a high quality photocopy of an unconnectorized prior art fiber sample analyzed by Applicants.

FIG. 9 is a high quality photocopy of a virgin sample noted above. Clearly visible are areas of abnormal light scattering. These are understood to be caused by delamination of the hard polymer cladding from the core and/or cracking and crazing of the cladding. A black circle 140 encloses one such abnormal light scattering area 144. These abnormal light scattering areas 144 can be seen by the naked eye under ordinary lighting by appropriately positioning the prior art fiber relative to the source of light. Hard polymer claddings, such as claddings comprising the HCS and TECS materials, can be brittle and hence fail to adhere well to the core. The Tefzel buffer shrinks and at least in part can counteract this tendency to delaminate.

B. Analysis a) Theoretical Analysis

Figure 10A:
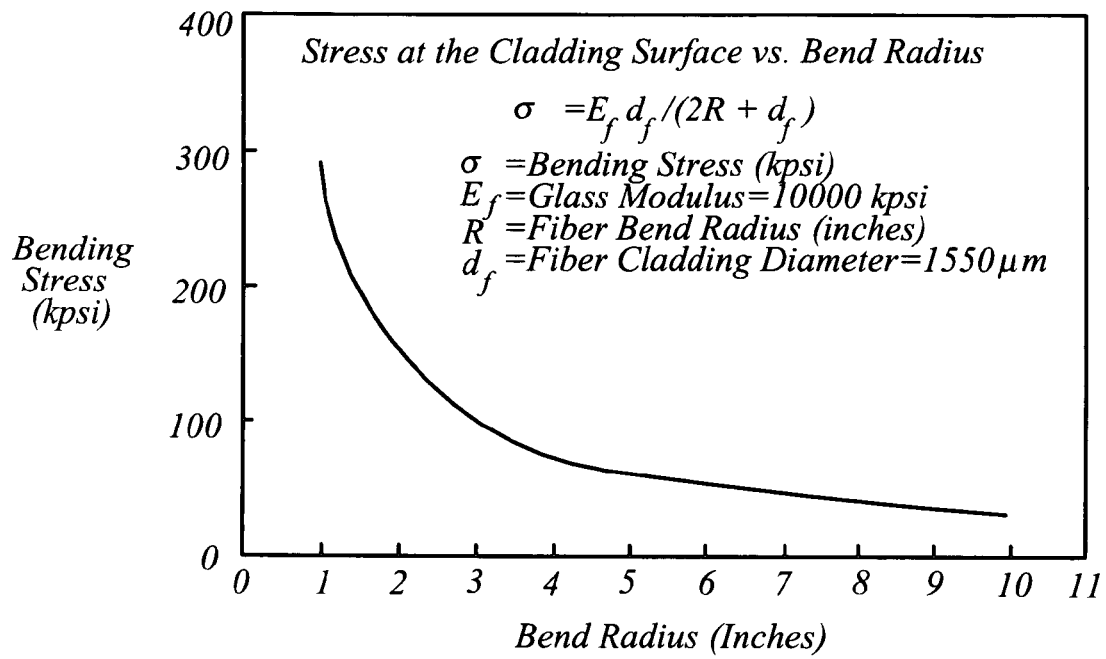
FIG. 10A is a plot of stress imposed on a glass fiber verses bending radius.

The stress applied to the fiber under normal use (bending to a radius of at least six (6) inches) was calculated and compared with the glass fracture stress in order to ascertain that the stress to which the failed fibers were being subjected to during normal usage. Bending can induce stress and contribute to aging of the fiber by inducing and growing cracks which can propagate and cause fiber failure. The maximum tensile stress generated at the bend apex, $\sigma_{max}$, is related to the bend radius, R, via the following equation.

$$\sigma_{max} = E_f d_f / (2R + d_f) \quad (1)$$

where $E_f$ and $d_f$ are the modulus and the diameter of the fiber, respectively. The maximum bending stress was calculated versus the bending radius using equation (1) and the data are plotted in FIG. 10A. FIG. 10A includes the parameters used for the calculation. Bending stress decreases rapidly with increasing bend radius. During use, the delivery fiber is typically bent to a radius of six (6) inches (and probably to less than six (6) inches by over zealous users). The plot shows that the maximum bending stress at the surface 147 of the core 42 of the delivery fiber (see FIG. 3) is 50.6 kpsi. If this applied stress exceeds the fracture stress of glass, the delivery fiber will fail during usage. Significantly, this calculation agrees well with the estimate from the signature of the end face 88 of the fiber shown in FIG. 4 (see also FIG. 6).

Next, the fracture stress of the glass was calculated using fracture mechanics. This approach assumes that the material contains a distribution of surface and subsurface flaws such as microcracks. The fracture stress, $\sigma_f$, can be calculated using the following equations.

$$\sigma_f = KIC / (Y\sqrt{c}) \quad (2)$$

where KIC is the fracture toughness of glass, Y is the flaw shape factor ($\sqrt{\pi}$ for surface defects and $2/\sqrt{\pi}$ for internal defects), and c is the size of the flaw. Fracture stress was calculated versus the crack or flaw size (located on the surface 147 of the silica core 42 of a fiber such as the prior art fibers) using equation (2). The data are plotted in FIG. 10B, which also includes the various parameters used for the calculation. Fracture stress decreases rapidly with increasing flaw size. For flaw sizes of less than 1.7 μm, the fracture stress is below 50.6 kpsi. This suggests that the prior art delivery fiber 40 will survive a six inch bend radius only if the flaws on the surface of the glass were smaller than 1.7 μm. This is a very stringent requirement.

b) Failure Mechanisms for Prior Art Fibers

Figure 10B:
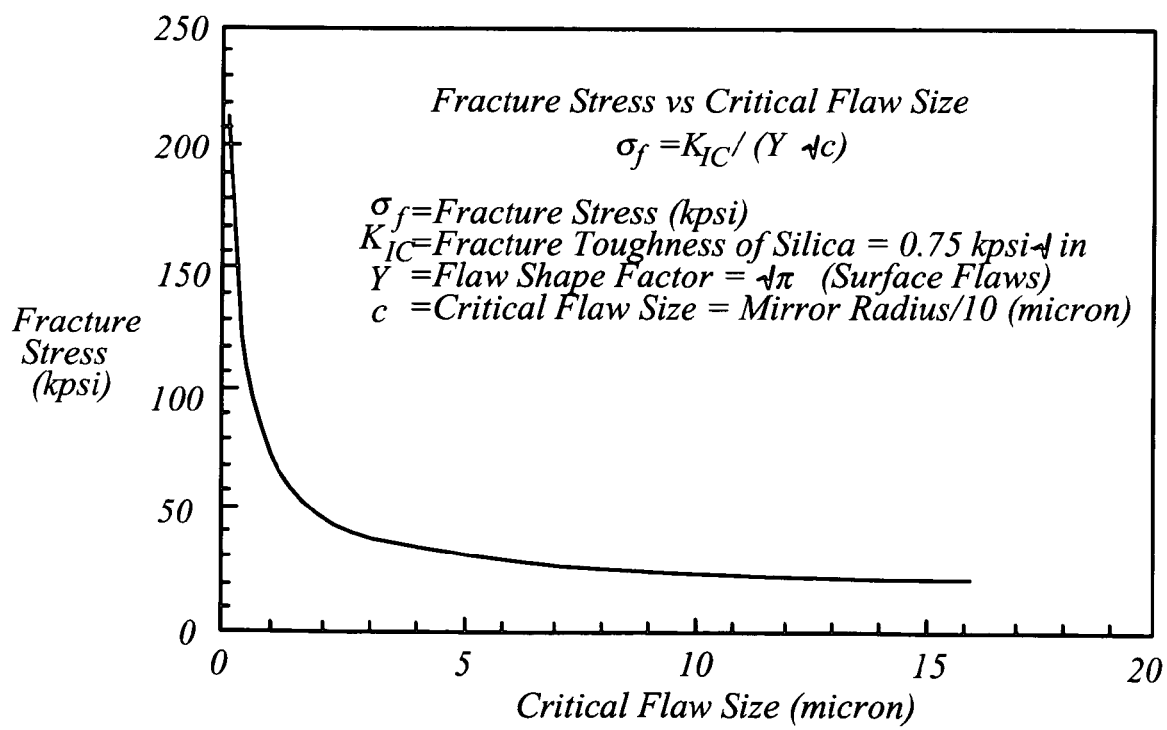
FIG. 10B is a plot of fracture stress versus the crack or flaw size for a flaw or crack located on the surface of glass fiber.

As demonstrated above, the failed delivery fibers include non-conforming regions, which can include particulate material. The non-conforming regions have diameters in the 25-100 μm range. It is highly likely that at least some of the non-conforming regions are in contact with the glass core of the fiber. The delamination, cracking and/or crazing of the fiber cladding shown in FIG. 9 further increases the likelihood that a non-conforming region contacts the glass core of the delivery fiber. Presence of non-conforming regions can have many deleterious effects that can lead to the fiber failures. Without intending to be bound by any one theory, Applicants discuss the following failure mechanisms related to non-conforming regions that they have identified:

(1) The presence of non-conforming regions suggests that the surface of either the core or the cladding will have many sub-micron to micron sized cracks. If any of these cracks exceed 2 μm in size, they will propagate rapidly under the typical load placed on the fiber when bent when in use as indicated by FIGS. 10A and 10B. In one example noted above, bending the fiber to a six inch bend radius can quickly lead to a mechanical failure of the fiber.

(2) The cladding, especially at the interface of the core and the cladding, is exposed to the power propagated by the core and must have low optical absorption to avoid heating. The non-conforming regions comprise regions that can absorb this laser energy and overheat. The generated heat can lead to several effects that can cause fiber failure.

(a) In the simplest case, glass will lose its strength at the hot spot (strength of materials decreases with temperature), such that the actual ultimate strength of the fiber in the local region becomes much smaller. Under such conditions, stress induced by bending can exceed the fiber strength leading to catastrophic failure.

(b) Thermal energy promotes crack formation and/or propagation of existing microcracks, which are always present in glass fiber. Such growing cracks scatter additional light, further exacerbating the heating of the non-conforming region. The fiber enters a vicious "thermal runaway" cycle of additional damage that promotes additional heat absorption, crack formation and growth, and hence more damage. A small flaw that under normal conditions may not propagate at stress corresponding to a typical bend radius may become large enough to propagate at the same stress leading to premature failure.

(c) A "thermal runaway" hot spot that grows in the cladding may burn the polymer buffer leaving residue behind which intimately mixes with the glass and becomes more absorbing leading to even more heating and thermal runaway. There is evidence to suggest that enough heat is generated to actually melt some of the glass core (FIG. 7). Significantly, our observations indicated melting at the surface of the fiber. Such softening of the glass leads to rapid failure.

(3) Particulate material, if present at the outside of a bend, can actually act as a heated wedge that is driven by an outer material, such as, for example, the Tefzel, which is in tension, into the surface of the glass core at the exact area where the glass is subject to the maximum tensile stress caused by the bend, contributing to failure of the fiber.

(4) Combinations of the foregoing effects are probable. For example, the cracks discussed in (1) above will lead to additional scattering, exacerbating the thermal effects discussed in (2)(a)-(2)(c).

In summary, the present Applicants studied failed fibers having a polymer cladding. The sample fibers studied were understood to have failed catastrophically when in use or under test prior to be shipped to a customer. The fibers studied comprised a silica core having a 1500 μm diameter, surrounded by a 25 μm thick hard polymer material (either HCS or TECS), which was in turn surrounded by a 225 μm thick Tefzel® buffer. The HCS or TECS materials provided a NA of at least 0.35.

Several possible failure mechanisms are discussed above. The exact failure mechanism in a particular instance of fiber failure is likely due to one or more of the foregoing effects. However, in each instance non-conforming regions are understood to play a major role, and hence Applicants consider, as a result of their study, that improving the non-conforming region density (e.g., reducing the size and/or number of non-conforming regions) provides an improved fiber less prone to catastrophic failure.

Figure 11:
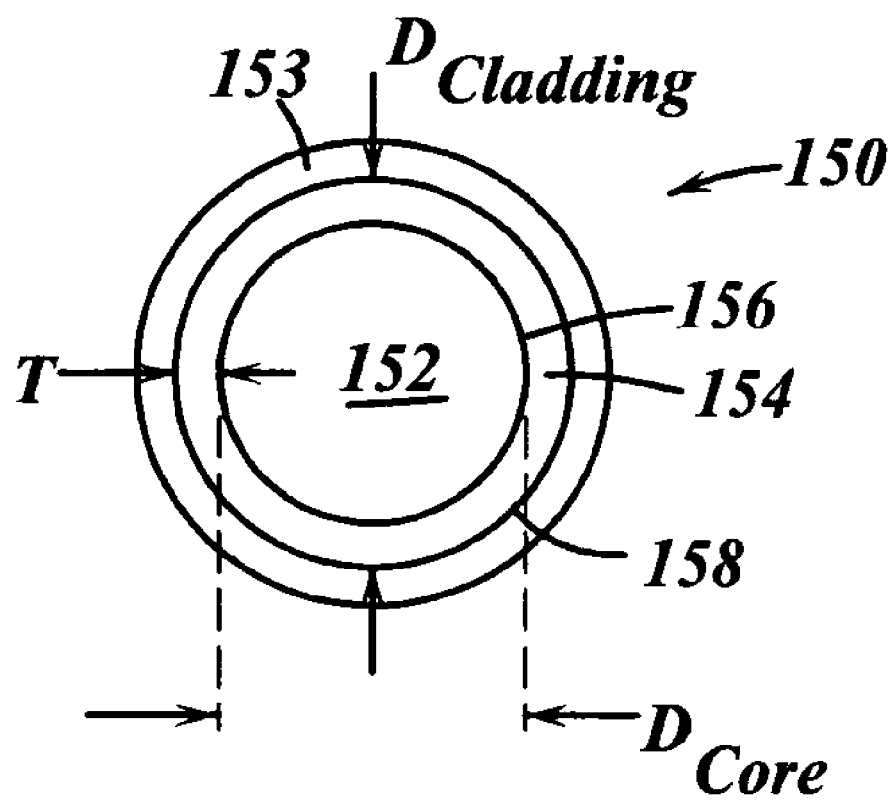
FIG. 11 illustrates a cross section of one optical fiber according to the invention.

FIG. 11 illustrates an optical fiber 150 according to the invention. The optical fiber is adapted to reduce or eliminate the incidence of the failures described above. The optical fiber 150 comprises a core 152, a cladding 154, which can comprise a polymer, disposed about the core 152 and, optionally, a material 153 disposed about the cladding 154. In general, stating herein that a first region, such as, for example, a cladding is "disposed about" another region means that the first region surrounds, at least partially, the other region, and may additionally contact the other region, if there are no intermediate regions interposed between the first region and the other region. As shown in FIG. 11, the cladding 154 can contactingly surround the core 152 so as to form the cladding-core interface 156. The diameter D of the core 152 can be 1500 microns or greater. However in certain practices of the invention the diameter D is less than 1500 microns so as to reduce the stress to which the fiber 152 is subjected when bent. As noted above, optical delivery fibers are often bent as they are moved around so as to image, illuminate, measure or modify a different portion of the work object. The cladding 154 can be a hard polymer cladding. The cladding can comprise one of the aforementioned HCS and TECS claddings. Although in FIG. 11 the cladding 154 is shown as contactingly surrounding the core 152, in certain practices of the invention intermediate layers or claddings may be interposed between cladding 154 and core 152. According to the invention, including the Applicants discovery of non-conforming regions in prior art fibers and hence the cause of prior catastrophic failures, the optical fiber 150 comprises an improved non-conforming region density. One approach to reducing the non-conforming region density of the fiber is to perform certain steps in the manufacture of the fiber in a clean environment, as described in more detail below.

Hard polymer materials suitable for the cladding 154 are well-known in the art, and include other coatings in addition to the predominate HCS and TECS materials, which are understood to have particular advantages. In his aforementioned article, Dr. Skutnik, who is understood to be an important inventor of more than one formulation of a hard polymer material suitable for use as a cladding, notes the many advantages of hard polymer claddings for uses such those shown in FIG. 1, and in particular for medical uses. However, there is no discussion of the role of non-conforming regions in fiber failure. Although failures are noted, they are generally ascribed to vaporization of the cladding due to fundamental limitations of the thermal stability of the hard clad polymer.

Formulations of hard polymers typically comprise, but are not limited to, highly fluorinated esters of acrylic or methacrylic acid and can include one or more of crosslinking multi-functional acrylates and methacrylates, photoinitiators and adhesion promoters. Catalysts and thermal curing additives can also be included. The base polymer forming component can include monomers and oligomers of the fluoroacrylates. Adhesion promoters can be materials that bond easily to silica surfaces and are compatible or attracted to the basic polymeric backbone.

One approach to providing the optical fiber 150 having an improved non-conforming region density is to fabricate the fiber, or at least perform some of the steps of fabricating the fiber, in a "clean" environment.

Figure 12:
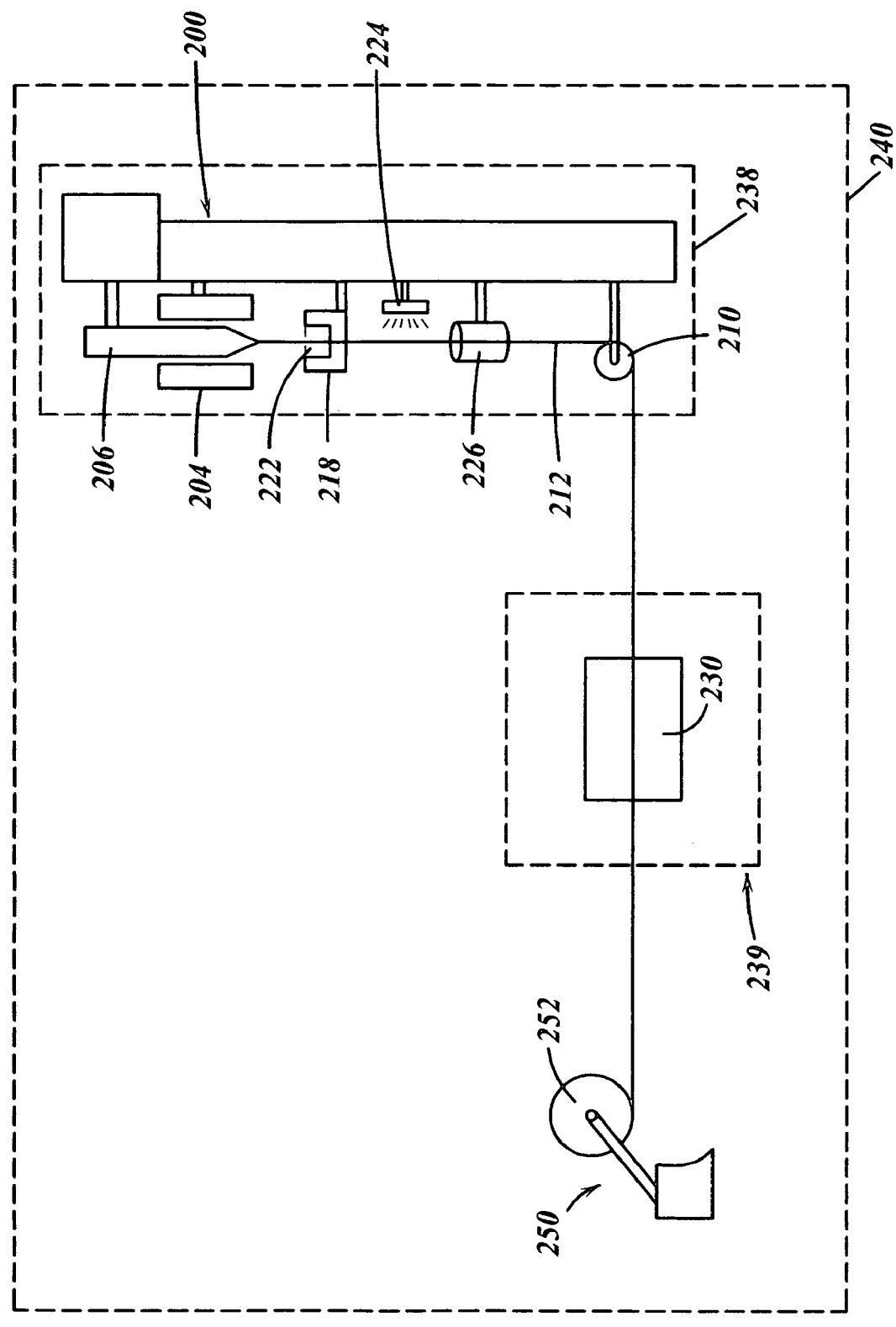
FIG. 12 schematically illustrates apparatus for manufacturing an optical fiber such as the fiber shown in FIG. 11.

FIG. 12 schematically illustrates a typical apparatus for manufacturing a fiber wherein the fiber is drawn from a preform (other techniques, such as the double crucible technique, are also known, and are within the scope of the invention). A draw tower 200 includes furnace 204, such as a high frequency induction furnace or a resistance furnace that heats the preform 206. A spool 210 pulls the optical fiber 212 from the preform 206. A coating apparatus 218, such as a die coater, can be provided to coat the fiber with a selected material, such as a hard polymer that can form the cladding 154 of FIG. 11 (e.g., HCS or TECS cladding). The selected material is typically contained by the apparatus 218 in liquid form, as indicated by reference numeral 222. Apparatus 224 provides radiation (e.g., UV light) for curing the selected material. Other curing apparatus, such as thermal curing apparatus or electron beam curing apparatus, is also known in the art, and can be suitable with certain materials. As is typical in the art, a diameter measuring element 226 can be included for monitoring the diameter of the optical fiber 212. Feedback from the diameter measuring element can be used to adjust draw parameters, such as the temperature of the furnace 204, the speed of the draw, and the tension at which the fiber is drawn so as to maintain a selected diameter of the optical fiber 212.

The extruder 230 can be included for extruding a material, such as for example, Tefzel (e.g., see reference numeral 153 in FIG. 11) over the fiber, and typically over the polymer cladding 154. The extruder 230 can heat the Tefzel material and can include a screw that forces the heated Tefzel material through an aperture, through which the optical fiber 212 passes, and onto the cladding of the optical fiber 212. The extruder 230 is typically located at some distance from the draw tower 200. Spooling apparatus 250 winds the fiber 212 onto the spool 252.

In one practice of the invention, most, if not all, of the equipment shown in FIG. 12 is located in an environment meeting a certain cleanliness class designation (as indicated by the dotted line 240 of FIG. 12), thereby reducing the non-conforming region density of the resultant optical fiber.

The cleanliness of an environment can be determined according to a standardized and widely accepted procedure. For example, environments can be classified as class 10,000, class 1000 and class 100. The class designation refers to the particle count and/or size per unit volume of the air in the environment, as determined by actual measurements of the environment. An environment meeting a particular class designation can be provided in a number of different ways. One technique, well known in the semiconductor industry, is to provide a controlled, sealed "clean room" that is constructed with appropriate materials for the ceiling, walls and floors (e.g., materials that do not attract or generate dust), extensive air handling and filtering equipment to continually process the air in the clean room and maintain selected humidity and temperature conditions, as well as positive pressure in the clean room such that air tends to exit, rather than infiltrate, the clean room. Access is limited to such a clean room, and it is preferred that certain procedures be followed by personnel working in the clean room. These procedures are well-known, again in the semiconductor industry, and involve the wearing of special clothing, such as gowns, caps, "booties" and the like. Often the clean room can only be entered via a special "gowning room", where the foregoing clothing is donned. Also, interlocks can be provided such that only one door can be opened to the clean room at a time. In addition to expensive air handling and filtering equipment, equipment can also be provided for maintaining the laminar flow of filtered air in critical areas. A class 1000 environment is considered a cleaner, and hence better, environment than a class 10,000 environment. Providing at least a class 1000 environment means providing a class 1000 or better environment.

Accordingly, in one practice of the invention, a clean room provides a clean environment for selected procedures in manufacturing an optical fiber.

Another approach is to equip the draw tower with a closed environment in which the fiber is drawn. Such draw towers are available, for example, from Nextrom of Norcross, Ga., USA, an established provider of drawing equipment for optical fiber. Optimally, to provide the cleanest environment, a draw tower having its own clean environment, indicated schematically by the dotted line 238 in FIG. 12, is located in an outer clean environment 240.

In another approach, a clean environment is provided for the extruder 230, as indicated by the dotted line 239. Again, it may be best to combine all of the foregoing approaches, and locate all of the foregoing equipment in a clean environment as indicated by the dotted line 240.

As is apparent from the foregoing discussion, the provision of a clean environment for one or more of the processes involved in manufacturing optical fiber is a very expensive, laborious and time-consuming endeavor. Accordingly a clean environment is typically provided only when understood to be absolutely necessary. It is known in the art that certain types of optical fibers require a clean environment. For example transmission fibers, such as the fiber known as "SMF-28" and specialty fibers, such as rare earth doped (RED) fibers, are typically drawn in a clean environment. This is because these fibers, which have a glass cladding contacting a core, are either very thin (many have an outer glass diameter of 125 microns or less) and/or are drawn at relatively high draw speeds to reduce the cost of producing the fiber. Very thin fibers are much less tolerant of non-conforming regions introduced onto the fiber surface by being drawn in a "dirty" environment and are more likely to break. In addition, the higher draw speeds subject the fiber to increased stress, also increasing the tendency of the fiber to break. For example, such fibers can be drawn at speeds approaching tens of meters per second. Customers typically demand that long continuous lengths of such fibers be wound on spools for delivery of the fiber. In the case of transmission fiber, customers can expect continuous lengths on the order of kilometers. Conversely, thicker fibers, such as are typically used in the for the delivery of light with apparatus shown in FIG. 1, are more difficult to spool and it is less important to draw long, continuous lengths of the fiber. Also, thicker fibers tend to be used in much shorter lengths, such that breaks in the fiber can be tolerated. Accordingly, the prior art fiber shown in FIG. 3 is typically drawn at rather low speeds, such as, for example, speeds in the range of meters per second. Prior to the Applicants discovery that non-conforming regions present in a fiber can be the cause of the catastrophic failure of the fiber it was not thought necessary to draw fibers according to the invention in a clean environment.

Prior art fibers are understood to be drawn using equipment as shown in FIG. 12, but in an uncontrolled environment laden with particulate matter and with non-conforming region inducing contaminants.

Accordingly, the Applicants understand that prior art plastic clad fibers, and in particular TECS and HCS clad fibers, are drawn in a factory environment that does not include any particular provision for cleanliness. Accordingly, particulate matter or other non-conforming region inducing contaminants are readily present in the atmosphere and can contaminate the optical fiber 212 at any time during the process of drawing the fiber. For example, particulate matter can contaminate the core of the fiber prior to the coating of the core with the TECS or HCS material by the apparatus 218; particulate matter can contaminate the TECS or HCS material while it is in liquid form in the apparatus 218 (typically an "open cup" apparatus 218 is used in the prior art to apply TECS or HCS material) and prior to its application to the fiber; particulate matter can contaminate the HCS or TECS coating prior to the coating being cured by the apparatus 224; particulate matter can contaminate the cladding prior to the Tefzel coating being applied to the cladding. Because the Tefzel coating tends to shrink so as to hold the TECS or HCS cladding material to the core, such contaminants tend to be driven into the cladding by Tefzel coating. Non-conforming regions including particulate matter have ample opportunity to settle on the cladding prior to extrusion of the Tefzel coating.

Particles of the size discovered by the Applicants are plentiful in such an uncontrolled environment; a clean environment, as taught by the present invention, is understood to be one approach that can greatly reduce the particulate matter and other non-conforming regions that can be incorporated into an optical fiber during the manufacture thereof.

It is also noted that the extruder 230 heats the Tefzel such that it can be forced to coat the matter. Extruders can be difficult and time consuming to clean, and generate particulate in the form of metal grindings and burned Tefzel. Such metal grindings and burned material, especially if allowed to build up in or near the extruder orifice, could deposit on the cladding. It is highly likely that at least some of the particulate matter observed by Applicants includes such metal (hastalloy) particles and/or burned Tefzel material. Regular cleaning, alternatively or in addition to the provision of any clean environments, of the extruder 230 is understood to, in certain circumstances, reduce the non-conforming region density of the optical fiber, in accordance with the present invention.

Fibers according to the present invention, such as the fiber illustrated in FIG. 11 can be made in manner to reduce non-conforming region, and can comprise materials disclosed and/or claimed in the following United States patents: U.S. Pat. No. 4,511,209, issued on Apr. 16, 1985; U.S. Pat. No. 4,707,076, issued Nov. 17, 1987; U.S. Pat. No. 4,852,969, issued Aug. 1, 1989; U.S. Pat. No. 4,884,866, issued Dec. 5, 1989; U.S. Pat. No. 5,203,896, issued Apr. 20, 1993; U.S. Pat. No. 5,302,316 issued Apr. 12, 1994; and U.S. Pat. No. 5,690,863 issued Nov. 25, 1997. The foregoing United States patents are herein incorporated by reference to the extent necessary to understand the present invention. For example, the cladding 154 of the fiber 150 can comprise one or more of the materials disclosed or claimed in the foregoing patents. The foregoing materials can be applied in a clean environment, such as, for example, at least a class 10,000 environment, at least a class 1000 environment, or at least a class 100 environment, or otherwise have a improved non-conforming region density such as described in more detail below.

As one example, U.S. Pat. No. 4,511,209 teaches a composition comprising a highly fluorinated monofunctional acrylate and constituting more than 50% by weight of the composition, a polyfunctional acrylate being trifunctional or higher serving as a crosslinking agent, a mono or polyfunctional thiol that functions as a synergist, and a photoinitiator. In one practice, the highly fluorinated monofunctional acrylate can comprise 50 to 80% by weight of the composition, the polyfunctional acrylate comprises 2.0 to 35% by weight of the composition, the thiol synergist can comprise 0.5 to 20% by weight of the composition, and said photoinitiator comprises 0.5 to 20% by weight of the composition. In another practice, the highly fluorinated monofunctional acrylate comprises 60 to 90% by weight of the composition, the polyfunctional acrylate comprises 5 to 25% by weight of the composition, the thiol synergist comprises 1 to 10% by weight of the composition, and the photoinitiator comprises 1.0 to 10% by weight of the composition.

As another example, U.S. Pat. No. 4,707,076 teaches a composition comprising the cured reaction product of at least one ethylenically unsaturated monoene, an ethylenically unsaturated polyene, and a curing initiator. The composition can comprise about 10.0 to about 95.0 weight percent of the ethylenically unsaturated monoene, about 2.0 to about 70.0 weight percent of the ethylenically unsaturated polyene, and about 0.4 to about 20.0 weight percent of the curing initiator. In one practice, the composition can comprise 35.0 to about 95.0 weight percent of the ethylenically unsaturated monoene, about 4.0 to about 45.0 weight percent of the ethylenically unsaturated polyene, and about 0.7 to about 10.0 weight percent of the curing initiator. The ethylenically unsaturated monoene or polyene can include one or more of a silane functional group, an alkoxy or hydroxy functional group, and an ethylenically unsaturated monoene or polyene containing a halogen. The halogen can be fluorine. The monoene or polyene can include an acrylate and/or a methacrylate.

As a further example, U.S. Pat. No. 4,852,969 teaches a composition comprising at least one of a silyl 2-amidoacetate and a silyl 3-amidopropionate, which can be the reaction product of a silanol and an azlactone. The composition can further comprise in the range of 0.1 to 10.0 mole percent of a cyclic amidine catalyst. In this practice, the silanol can have a molecular weight in the range of less than 1000 up to 500,000, and additionally or alternatively, the silanol can have an insoluble network structure having an essentially infinite molecular weight. The network structure can further comprise at least one atom selected from the group consisting of aluminum, sodium, phosphorus, boron, molybdenum, and magnesium atoms. The insoluble silanol can be a non-crystalline silica. The azlactone can be a monoazlactone. The monoazlactone can be a 2-alkyl or 2-aryl substituted azlactone. The azlactone can be a polyazlactone or a 2-alkenyl azlactone or a copolymer thereof. The copolymeric 2-alkenyl azlactone can be prepared from a mono- or multi(ethylenically unsaturated) comonomer.

In yet an additional example, U.S. Pat. No. 5,302,316 teaches a composition comprising (1) a first monomer represented by formula RfOCOC(R)=$CH_2$, wherein Rf represents a linear or branched fluorinated alkyl group having not less that 6 carbon atoms, a hydroxyl substituted fluorinated alkyl having not less that 6 carbon atoms, a fluorinated sulfonamide having not less that 6 carbon atoms, or a fluorinated amide having not less that 6 carbon atoms, and R represents H, F, or $C_{1-10}$ fluorinated alkyl; (2) a second monomer represented by formula Rf"OCOC(R)=$CH_2$ (B) wherein Rf" represents a linear or branched $C_{1-5}$ fluorinated alkyl and R represents —H, —F, or —$CH_3$; and (3) at least one polyfunctional methacrylic curable monomer, wherein the weight ratio of the first monomer to the second monomer ranges from 75:25 to 99:1.

Returning to FIG. 11, in one practice of the invention, there is provided an improved optical fiber for delivering optical energy including a selected wavelength to or from a work object. The core 152 of the optical fiber 150 can be a multimode glass core comprising a diameter D of at least 250 microns, and in one variation, at least 500 microns. The polymer cladding 154 can contactingly surround a glass portion of said fiber, such as, for example, the core 152 or a glass clad (not shown) interposed between the core 152 and the cladding 154. The polymer cladding 154 comprises an index of refraction that is less than the index of refraction comprised by the core 152. The polymer cladding 154 can comprise a thickness and can contactingly surround the glass portion so as to define an interface 156 between the glass portion (e.g., the core 152) and the polymer cladding 154. The fiber can comprise a density of less than 0.25 non-conforming regions having a diameter of 25 microns or greater per millimeter of length along said fiber where the non-conforming region has at least a portion thereof within a distance of said interface, where the distance is less than or equal to the thickness T of the polymer cladding 154.

The polymer cladding 154 can be a hard polymer cladding. The non-conforming region density can be less than 0.1 non-conforming regions per millimeter or less than 0.05 non-conforming regions per millimeter. Independent of, or in conjunction with, the foregoing recited non-conforming region densities, the non-conforming region can have a diameter of at least 10 microns. The density can be less than 0.25 non-conforming regions having a diameter of no greater than 10 microns per millimeter of length along the fiber.

The polymer cladding 154 can be applied to the fiber in a selected environment (e.g., at least a class 10,000, at least a class 1000 or at least a class 100 environment). The polymer can comprise a TECS or HCS material. In one variation, the fiber 150 can comprise another cladding disposed about the core 152, where the other cladding comprises a second index of refraction that is less than the index of refraction comprised by the core and greater than the index of comprised by the polymer cladding 154. In this practice, the polymer cladding 154 is disposed about the other cladding.

The core can consist essentially of silica, can consist of silica, or can comprise substantially pure silica. As shown in FIG. 11, in one practice, the cladding 154 contactingly surrounds said core. The index of refraction profile of the core relative to the cladding can comprise a step index of refraction profile. The fiber can include the outer material 153, which can be extruded over the fiber, and which can comprise Tefzel. The material 153 can be applied to the fiber 150 in a selected environment. The selected environment can be at least a class 10,000 environment, at least a class 1000 environment, or at least a class 100 environment.

In another embodiment of the present invention, there is provided an improved optical fiber for delivering optical energy including a selected wavelength to or from a work object. The optical fiber 150 can include a core 152, which can be a multimode glass core, comprising a diameter of at least 250 microns and a cladding 154 comprising a polymer, which can be a hard polymer, surrounding a glass portion of the fiber, where the cladding 154 is applied to at least a part of the fiber in fiber in a selected environment. The selected environment can be at least a class 10,000 environment, at least a class 1000 environment, or at least a class 100 environment.

The core 152 and the cladding 154 each comprise a respective index of refraction, and the cladding can comprise an index of refraction that is lower than the index of refraction comprised by the core 152.

The core can consist essentially of silica, can consist of silica, or can comprise substantially pure silica. As shown in FIG. 11, in one practice the cladding 154 contactingly surrounds said core. The index of refraction profile of the core relative to the cladding can comprise a step index of refraction profile. The fiber can include the outer material 153, which can comprise Tefzel. The material can be applied to the fiber 150 in a selected environment. The selected environment can be at least a class 10,000 environment, at least a class 1000 environment, or at least a class 100 environment.

The improved optical fiber can comprise a non-conforming region density of less than 0.1 non-conforming regions per millimeter of length along said fiber, where the non-conforming region has a diameter of at least 10 microns and at least a portion thereof is within a distance of the interface 156, where the distance is less than or equal to the thickness T of the cladding 154. The fiber having the aforementioned non-conforming region density can comprise Tefzel.

Several coating compositions are discussed above. Exemplary fibers using certain compositions are now described.

In one practice of the invention, there is provided an improved optical fiber comprising a core; a cladding disposed about said core, said cladding comprising an ultraviolet light cured composition, said composition comprising a fluorinated monofunctional acrylate constituting more than 50% by weight of the composition, a polyfunctional acrylate being trifunctional or higher serving as a crosslinking agent, a mono or polyfunctional thiol that functions as a synergist, and a photoinitiator. The cladding can be applied to at least part of the fiber in a selected environment (e.g., at least a class 10,000 environment, at least a class 1000 environment, or at least a class 100 environment).

In another practice of the invention, there is provided an improved optical fiber, comprising a core, a cladding disposed about said core, said cladding comprising an ultraviolet light cured composition, said composition comprising a fluorinated monofunctional acrylate constituting more than 50% by weight of the composition, a polyfunctional acrylate being trifunctional or higher serving as a crosslinking agent, a mono or polyfunctional thiol that functions as a synergist, and a photoinitiator. The fiber can comprise a non-conforming region density of less than 0.1 non-conforming regions per millimeter of length along said fiber, where the non-conforming region has a diameter of at least 10 microns and at least a portion thereof is within a distance of the interface between the core and the cladding, where the distance is less than or equal to the thickness of the cladding.

In an additional practice of the invention, there is provided an improved optical fiber for delivering optical energy including a selected wavelength to or from a work object, comprising a glass core comprising an index of refraction; a cladding disposed about said core and having a first index of refraction that is less than said index of refraction of said core, said cladding comprising a composition comprising the cured reaction product of at least one ethylenically unsaturated monoene, an ethylenically unsaturated polyene, and a curing initiator; and wherein said composition is applied to at least a part of said fiber in a selected environment. The selected environment can be at least a class 10,000 environment, at least a class 1000 environment, or at least a class 100 environment.

In yet a further practice of the invention, there is provided an improved optical fiber for delivering optical energy including a selected wavelength to or from a work object, comprising: a glass core comprising an index of refraction; a cladding disposed about said core and having a first index of refraction that is less than said index of refraction of said core; wherein the fiber comprises a non-conforming region density of less than 0.1 non-conforming regions per millimeter of length along said fiber, where the non-conforming region has a diameter of at least 10 microns and at least a portion thereof is within a distance of the interface between the core and the cladding, where the distance is less than or equal to the thickness of the cladding; and wherein said cladding comprises a composition comprising the cured reaction product of at least one ethylenically unsaturated monoene, an ethylenically unsaturated polyene, and a curing initiator.

In yet another practice of the invention, there is provided an optical fiber for delivering optical energy including a selected wavelength to or from a work object, comprising: a glass core comprising an index of refraction; a cladding disposed about said core and having a first index of refraction that is less than said index of refraction of said core, said cladding comprising a composition comprising at least one of a silyl 2-amidoacetate and silyl 3-amidopropionate; and wherein said composition is applied to at least a part of said fiber in a selected environment. The selected environment can be at least a class 10,000 environment, at least a class 1000 environment, or at least a class 100 environment.

In another practice, there is provided according to the invention an improved optical fiber for delivering optical energy including a selected wavelength to or from a work object, comprising a glass core comprising an index of refraction; a cladding disposed about said core and having a first index of refraction that is less than said index of refraction of said core; said fiber comprising a non-conforming region density of less than 0.1 non-conforming regions per millimeter of length along said fiber, where the non-conforming region has a diameter of at least 10 microns and at least a portion thereof is within a distance of the interface between the core and the cladding, where the distance is less than or equal to the thickness of the cladding; and wherein said cladding comprises a composition comprising at least one of a silyl 2-amidoacetate and silyl 3-amidopropionate.

In each of the foregoing exemplary fibers, the cladding can be applied to at least part of the fiber in a selected clean environment (e.g., at least a class 10,000 environment, at least a class 1000 environment, or at least a class 100 environment). The core can comprise a diameter of at least 250 microns. The core can consist of silica, can consist essentially of silica, or can comprise substantially pure silica. The fiber can comprise an index of refraction profile of the core relative to the cladding, which can comprise a step index of refraction profile. The fiber can comprise a non-conforming region density of less than 0.1 non-conforming regions per millimeter of length along said fiber, where the non-conforming region has a diameter of at least 10 microns and at least a portion thereof is within a distance of the interface between the core and the cladding, where the distance is less than or equal to the thickness of the cladding. The fiber can comprise Tefzel, which can be applied in a selected clean environment.

A core of a fiber according to the invention can a diameter $D_{core}$ and an index of refraction, and a cladding disposed about the core can comprise an outer diameter $D_{cladding}$ and a first index of refraction that is less than the index of refraction comprised by the core. In certain practices of the invention, $[D_{cladding}/D_{core}]^2$ is no greater than 1.5. In evaluating the foregoing ratio, if one or both of the diameters $D_{core}$ and $D_{cladding}$ have a maximum and a minimum value, the maximum value is used in the foregoing formula. Typically the cladding is the cladding nearest the core.

A fiber according to the invention can operate a selected operating wavelength, which can be selected to be in the range from about 200 nm to about 2 microns. In one practice, the operating wavelength is no less than 180 nm; in another practice, the operating wavelength is no greater than 2 microns. The operating wavelength can be greater than 2 microns, (e.g., the operating wavelength can be no less than 20 or no less than 30 microns, such as, for example, when a fiber according to the invention is based on a chalcogenide glass). A core of a fiber according to the invention can be multimode at a selected wavelength. For example, by way of presenting examples and not of limitation, a core of a fiber according to the invention can be multimode so as to support at least 50 modes; at least 100 modes; at least 500 modes; at least 1000 modes; or at least 5000 modes at a wavelength of operation. In certain practices of the invention, the core of the fiber can have a numerical aperture that can be from 0.1 to about 0.6. For example, the numerical aperture of the core can be no less than about 0.12.

Typically a fiber according to the invention includes a core that is substantially free of any rare earths, where the rare earths are those elements having atomic numbers from 57 to 71.

"Hard polymer" as that term is used herein is understood by those of ordinary skill in the art (e.g., the HCS or TECS polymers described elsewhere herein and in the Skutnik article). A polymer can also have a selected modulus, such as a modulus of no greater than 500 MPa. In other practices of the invention, a polymer can have a modulus of no greater than 300 MPa; of no greater than 200 MPa; of no greater than 100 MPa; of no greater than 50 MPa; of no greater than 10 MPa; of no greater than 5 MPa; or of no greater than 2 MPa.

"Modulus", as used herein, means the segment modulus according to the test regime used, for example, by the DSM Desotech Company as described in the data sheet dated 4/03 for Desolite 3471-1-152A. Additional information can be found in the DSM Desotech 2001 product catalog. In such a test regime, the segment modulus is calculated by dividing stress by applied strain at 2.5% elongation. A least squares fit is applied to the data points up to 2.5% strain. If segment modulus cannot be measured or is clearly not appropriate, secant modulus can be used, where the first data point is set at the origin.

According to DSM Desotech, the test is performed on approximately 75 micron thick films cured in nitrogen at 1.0 J/cm² using one D lamp. The UV dose can be determined with a radiometer, such as an IL-390 radiometer manufactured by International Light, Inc. Films should be uniform in thickness and uniformly cured, and precautions taken to minimize film non-conforming regions that can arise from bubble or dust particle entrapment. Films can be cast with an automatic draw down apparatus, such as a Garner Mechanical Drive # AG-3860, equipped with an applicator, such as a 6 inch wide, 0.006-inch wide film thickness Bird Bar Applicator. The light source for curing can be a Fusion Systems Model DRS 120 equipped with a medium pressure D electrodeless/air cooled lamp where the lamp is focused. The light source can be of 300 watts (120 watts/cm), and an appropriate conveyer speed of from 15 ft/min to 150 ft/min can be selected by one of ordinary skill in the art. A freshly cleaned flat surface such as a glass plate or release paper can provide a substrate that generally produces satisfactory specimens. An Instron Universal Testing Instrument can be used to test a free 75 micron thick film conditioned for 16 hours at (and tested at) 23 Celsius and 50% relative humidity, with a specimen dimension of 1.3×12.7 cm, a gauge length of 5.1 cm and strain rate of 50% elongation per minute.

In certain practices of the invention, an optical fiber can include a polymer with a modulus of no less than 700 MPa.

A polymer can be an optically cured polymer. As used herein, an "optically cured polymer" is a polymer made by the process of exposing a precursor of the polymer to electromagnetic radiation (which can be light including, but not limited to, ultraviolet light) causing polymerization and/or crosslinking to form the cured polymer. Polymerization can occur through the formation of radicals (e.g., free-radical polymerization) or another mechanism, and/or crosslinking can occur through radical formation upon excitation of unsaturated polymer chains, or another mechanism. Optically cured polymers useful in the invention need not be fully optically cured, i.e., all precursor sites that can participate in polymerization and/or crosslinking need not have undergone a polymerization or crosslinking reaction. Typically, at least 50%, 70%, or 80% of such sites will have reacted. Such optically-cured polymers are well known to those of ordinary skill in the art. See, for example, the Desolite 3471-1-152A polymer noted above. Preferably the polymer is at least 80% cured (i.e., 80% of the aforementioned sites have reacted).

The invention can also comprise methods. One method comprises providing a source of optical energy; providing an optical fiber as described herein, receiving optical energy (e.g., at least one pulse of optical energy or a train of pulses) from the source and guiding the optical energy, such as the pulse or pulses, with the fiber, wherein the guided energy comprises a selected power level. For example, the at least one pulse can have a peak power of at least 5 kW. In other embodiments the pulse can have a peak power of at least 10 kW, at least 15 kW, or at least 20 kW. In yet additional embodiments, the fiber can receive an average power of at least 50 watts, of at least 100 watts, or at least 500 watts. In further embodiments, the fiber can receive an average power density of at least 2.9 kW/cm², an average power density of at least 4 kW/cm², an average power density of at least 6 kW/cm² or an average power density of at least 10 kW/cm².

Typically, pulses have a duration in the millisecond region, such as, for example, a duration selected to be from 0.1 milliseconds to 100 milliseconds; from 0.5 milliseconds to 10 milliseconds; or from 1 millisecond to 5 milliseconds. In one embodiment of the invention the pulse duration is approximately 3 milliseconds. The pulse repetition rate can be selected to be from 1 pulse per 5 seconds to 10 pulses per second. More typically the pulse repetition rate is approximately 1 Hz.

Providing an optical fiber can include providing a selected clean environment (at least a class 10,000, at least a class 1000, or at least class 100 environment); and at least one of drawing a glass fiber from a preform and applying a polymer cladding (e.g., a hard polymer cladding) to the glass fiber. The fiber can include Tefzel, which can be applied to the fiber in a selected clean environment.

Returning briefly to FIG. 1, it is desirable that the optical fiber 26 be as flexible and lightweight as possible. It is accordingly desirable that the diameter of the optical fiber 26 remain as small as possible. Thicker fibers are heavier, less flexible and more difficult, especially when manipulated directly by a human operator, to maneuver. Bends can be a particular vulnerable part of an optical fiber, as the fiber is under compressive and tensile stress at the bend.

Figure 13:
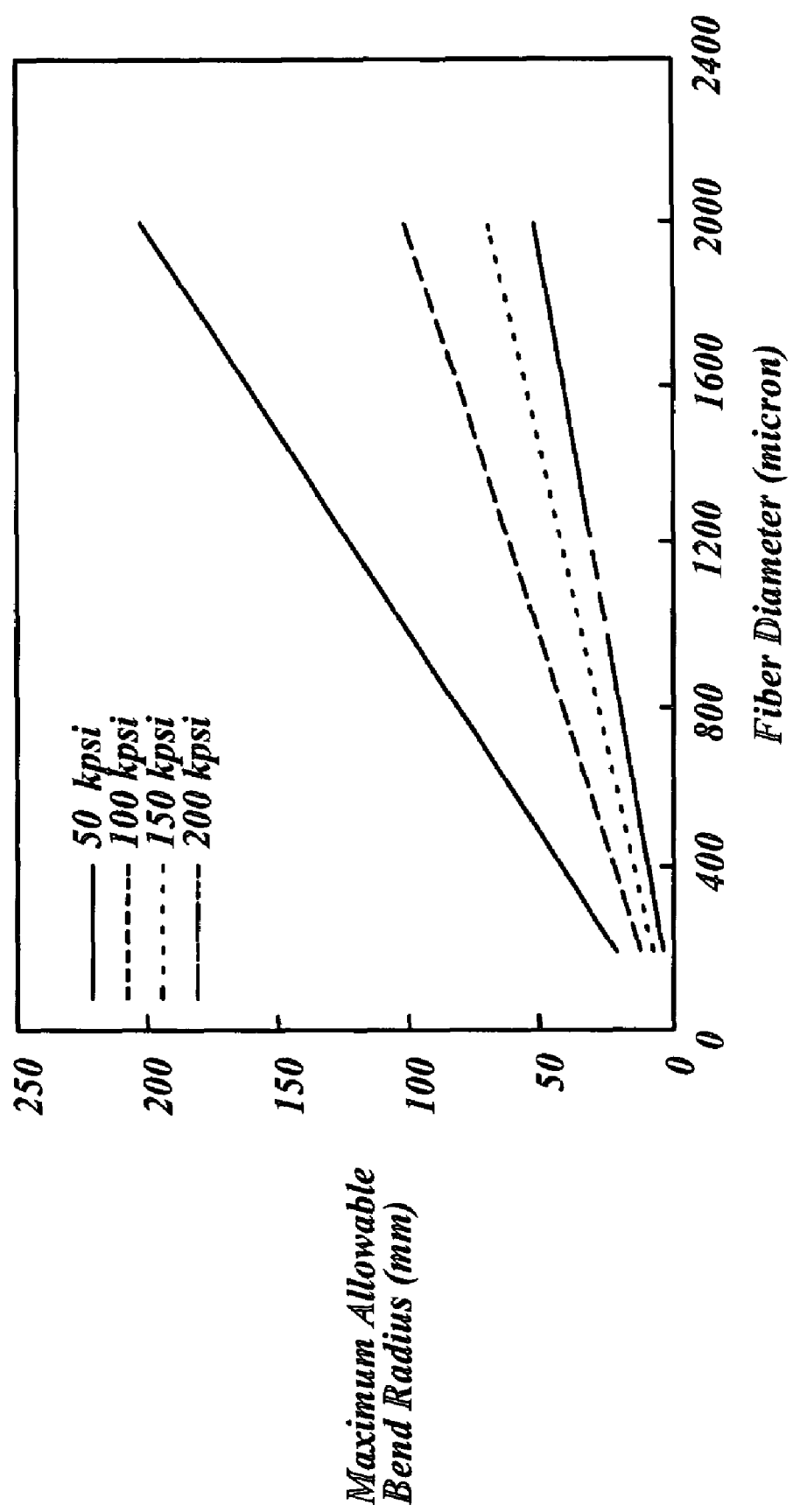
FIG. 13 is a plot of maximum allowable bend radius versus fiber diameter for fibers having various proof test strengths.

Stress can cause the fiber to fail by causing cracks, which are always present in fiber to some degree, to propagate and extend through the glass fiber, causing it to break. Bending causes stress that ages a fiber by inducing and growing these cracks, hastening the ultimate failure of the fiber. A radius to which a fiber can be safely bent can be calculated by assuming derated tensile strength (providing a safety margin) that can be calculated based on the ultimate proof strength of the fiber. In other words, the maximum stress that a fiber can withstand safely during use, $\sigma_{max}$, must be some fraction of the actual proof strength, $\sigma_p$, or $$\sigma_{max} = \sigma_p/s \qquad (1)$$

where s is the safety margin. The maximum allowable stress, $\sigma_{max}$, can be related to the long term bend radius, R by the following equation:

$$R = E_f d_f / 2\sigma_{max} = s E_f d_f / 2\sigma_p \qquad (2)$$

where $E_f$ and $d_f$ are the glass modulus (10000 kpsi) and the fiber diameter, respectively. The maximum allowable bend radius was calculated (for s=1) versus fiber diameter for different proof test levels and the results are shown in FIG. 13. FIG. 13 illustrates that decreasing the fiber diameter (at any given proof test level) and increasing the proof test level (at any fiber diameter) lowers the allowable bend radius thus reducing the possibility of breakage at larger bend radii and more robust use of the fiber.

However, a thinner fiber can have drawbacks. For a given amount of power that must be delivered to or from a work object, the light carried by the core of the optical fiber 26 will have a higher power density as the diameter is reduced. Light (in addition to the light that normally propagates in the cladding) tends to leak into the cladding at the bend. The cladding of the optical fiber 26 must be able to handle all of this light without sustaining damage. Thinner fibers expose the cladding to higher power densities, which the cladding must be able to handle without sustaining damage. Prior art fibers either have a lower NA, which exposed the cladding to more of the power propagated by the fiber, or include non-conforming regions. Both of the foregoing tend to contribute to the catastrophic failures noted in prior art fibers. It is considered that the present invention can, in certain aspects, allow thinner fibers to be used with a reduced risk of the catastrophic failures that have limited prior art fibers.

Methods and apparatus for providing optical fiber are now reviewed. As is well understood by those of ordinary skill in the art, one technique for fabricating an optical fiber includes first making a preform and drawing the optical fiber from the preform. A preform is a large glass member (typically a cylinder) that can be heated at one end so as to cause the glass to flow such that it can be drawn, or pulled, into an optical fiber. The optical preform is typically a scaled up model of the optical fiber, and includes a core and cladding which become the core and cladding, respectively, of the resultant drawn optical fiber. Considerable care is taken in fabricating the preform to ensure that the relative dimensions of the core and cladding, as well as the composition of the core and cladding, correspond to the desired dimensions and corresponding composition of the optical fiber to be drawn from the preform.

Fiber is typically drawn from the preform by mounting the preform atop a draw tower. As understood by one of ordinary skill in the art, a typical draw tower includes a high frequency induction furnace or a resistance furnace for heating one end of the preform. A spool pulls the fiber from the heated end of the preform and the fiber is wound onto the spool. A diameter measuring element can be included for measuring the diameter of the fiber, and appropriate feedback loops that maintain the desired diameter by adjusting one or more of 1) the rate at which the preform is fed into the furnace; 2) the tension with which the fiber is pulled; and 3) the temperature of the furnace. A coating apparatus can be provided for applying a protective coating to the outside of the fiber, and an ultraviolet curing station for curing the coating before the fiber is wound on the spool. Apparatus for monitoring the thickness and/or the concentricity of the protective coating is also usually included. The protective coating is typically an acrylate polymer. Draw tower technology is well understood by those of ordinary skill the art and further detail is not included here.

A preform can be made by a variety of suitable methods, including vapor phase methods such as outside vapor deposition (OVD), Modified Chemical Vapor Deposition (MCVD), Chemical Vapor Deposition (CVD) and Vapor Axial Deposition (VAD) and combinations thereof. Vapor phase methods usually employ suitable gas precursors that are introduced to a hot substrate, a hot zone, or directly into a flame. The latter technique is known as flame hydrolysis. In the flame hydrolysis technique, precursor gases are introduced to a flame to form soot that is deposited on a substrate, such as the inside, outside or end of a tube or rod. The soot is subsequently heated and sintered using an oven or furnace. The tube or rod can form a part of the resultant optical fiber preform, or can be removed. The OVD and VAD processes typically involve flame hydrolysis. In other vapor phase techniques, such as CVD and MCVD, precursor gases are introduced to a hot zone and/or a heated substrate, which can again be a tube or rod. One supplier of MCVD lathes and of draw towers is Nextrom Technologies of Finland. Nextrom Technologies has a U.S. office located at 1650 Satellite Boulevard, Duluth, Ga. 30097.

The technique known as "solution doping" can also be used to introduce materials into an optical fiber preform. In solution doping, soot is deposited on a substrate, and the soot is impregnated with a fluid precursor before sintering the soot into glass. Soot can be produced by one or more of the foregoing techniques, with modification when necessary to avoid contemporaneous sintering of the soot into glass. For example, MCVD can be used to deposit soot by reducing the temperature of the heating torch such that soot is deposited but not sintered on the inside of the substrate tube. The tube is then placed in a solution that includes fluid precursor materials, such as, for example, erbium chloride, that impregnates the porous soot. Subsequent drying, oxidation of the erbium and sintering of the soot provides a glass that includes $Er_2O_3$, as very desirable dopant for amplifying or generating light using an optical fiber. The solution doping technique can be used to incorporate a variety of other materials into an optical fiber preform. Solution doping can be used to introduce material into the preform that are otherwise difficult to introduce using standard vapor techniques, such as many of the rare earths. Solution doping is typically used to introduce rare earth and other dopants into the preform core.

Also known in the art are Sol-Gel techniques, wherein a suitable solution is cast in a mold and then gelled, removed and sintered to provide a glass article that can be part or all of a preform. For example, in one practice of the invention, the mold could include provision for forming the longitudinally extending apertures that will receive the stress inducing regions and the core of the resultant optical preform.

Each of the foregoing techniques can include one or more overjacketing steps wherein a member formed by one of the foregoing techniques is overjacketed with a glass tube that will typically form additional cladding. Glass tube and rods suitable for deposition of soot, the deposition of glass, or for use as an overjacket are available from Heraeus Amersil, Inc. 3473 Satellite Blvd., Duluth, Ga., 30096. The glass rods and/or tubes can include various types of glasses, such as, for example, silica glass, borosilicate glass, a fluorinated silica glass, a phosphate glass and other types of glasses.

Rods and tubes can also be made by casting molten glass into appropriate molds. For example, one technique for providing a tube is to cast molten glass into a mold that is spun on a lathe. Centrifugal force causes the molten glass to press outward against the walls of the mold such that the glass cools to form a tube.

Typically, a preform is a solid cylinder of glass made using one or more of the techniques described above. However, one or more of the foregoing techniques can be used to make glass members that are assembled together to form a preform. For example, it is known to insert selected rods inside tubes, without necessarily fusing the rods to the tubes, and to draw such a preform into a fiber. The rod-in-tube method can be used, for example, to fabricate microstructured fibers wherein the cladding includes a longitudinally extending array of features that alter the characteristics of the cladding (such as providing a photonic bandgap or lowering the average index of refraction of the cladding) such that light tends to be confined to the core. A vacuum can be applied to the assembly during drawing fiber from the preform.

The preform or one or more of the members included in the preform can be shaped, such as by grinding, so as to provide a desired geometrical feature in the resultant drawn fiber.

Techniques are known for fabricating an optical fiber without a preform. For example, the nested crucible technique is one of the older techniques known for forming an optical fiber. A first crucible containing molten glass that will form the cladding of the fiber is disposed about a second, inner crucible that contains molten glass that will form the core of the optical fiber. The crucibles include concentric openings from which the molten glass flows to form the optical fiber, with the opening of the second inner crucible being inside of the opening of the outer crucible. The nested crucible technique is not always favored, as impurities from the crucibles can be introduced into the glass fiber. However, the nested crucible technique is well established and has been used extensively, especially in the formation of non-oxide multicomponent glass fibers. The crucibles are heated to turn glass powder placed into the crucible into the molten glass that exits the apertures to form the optical fiber. Considerable care can be exercised in preparation of the glass powder, just as considerable care is exercised in the preparation of the preform.

Most typically, silica is the host glass of the optical fiber or preform, to which other materials are added. Common dopant materials used with silica include aluminum, boron, fluorine, germanium, phosphorus, titanium, the rare earths (such as, for example, erbium, ytterbium and lanthanum) and transition metals, which can be used to provide selected attenuation. However, other types of glass, such as, for example, chalcogenide glass, ZBLAN glass, phosphate glass, fluoride glass, germanium based glass and the like, as well as any of the single crystal or polycrystalline materials such as thallium bromoiodide, germanium, zinc selenide, and the like, may be found suitable. By way of example, and not of limitation, an optical fiber according to the invention may comprise any of these or other materials, or variants thereof, singly or in combination for the core, cladding or other layers.

Several embodiments of the invention have been described and illustrated herein. Those of ordinary skill in the art will readily envision a variety of other means and structures for performing the functions and/or obtain the results or advantages described herein and each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teaching of the present invention are used.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 7$^{th}$ Edition, Revision 1. Furthermore, statements in the specification, such as, for example, definitions, are understood to be open ended unless other wise explicitly limited.

We claim:

1. An optical fiber for delivering optical energy including a selected wavelength to or from a work object, comprising:
    a multimode glass core comprising a diameter of at least 250 microns, said core having an index of refraction;
    a polymer cladding having a thickness and contactingly surrounding a glass portion of said fiber so as to define an interface between said glass portion and said polymer cladding, said polymer cladding comprising a first index of refraction that is less than said index of refraction; and
    wherein said fiber comprises a density of less than 0.25 non-conforming regions having a diameter of 25 microns or greater per millimeter of length along said fiber, each of said non-conforming regions being a region visible to the human eye under an optical microscope and having at least a portion thereof within a selected distance of said interface, said distance being less than or equal to said thickness of said polymer cladding, said optical microscope having a total magnification of about 200.

2. The optical fiber of claim 1 wherein said density is less than 0.1 non-conforming regions per millimeter of length along said fiber.

3. The optical fiber of claim 1 wherein said density is less than 0.05 non-conforming regions per millimeter of length along said fiber.

4. The optical fiber of claim 1 wherein said density is less than 0.25 non-conforming regions having a diameter of 10 microns or greater per millimeter of length along said fiber.

5. The optical fiber of claim 1 wherein said polymer cladding comprises a hard polymer.

6. The optical fiber of claim 1 wherein said polymer cladding comprises one of an HCS and a TECS material.

7. The optical fiber of claim 1 comprising another cladding disposed about said core, said another cladding comprising a second index of refraction that is less than said index of refraction and greater than said first index of refraction, and wherein said polymer cladding is disposed about said another cladding.

8. The optical fiber of claim 7 wherein said core comprises a diameter $D_{core}$ and wherein said another cladding comprises a diameter $D_{cladding}$, where $[D_{cladding}/D_{core}]^2$ is no greater than 1.5, wherein if one or both of said diameters $D_{core}$ and $D_{cladding}$ have a maximum and a minimum value, the maximum value is used in the foregoing formula.

9. An optical fiber for delivering optical energy including a selected wavelength to or from a work object, comprising:
    a multimode glass core comprising a diameter of at least 250 microns, said core comprising an index of refraction;
    a polymer cladding contactingly surrounding a glass portion of said fiber, said polymer cladding comprising a first index of refraction that is less than said index of refraction; and
    wherein said polymer cladding is applied to at least a part of said fiber in at least a class 1000 environment; and
    wherein said polymer cladding has a thickness and forms an interface with said glass portion of said fiber, and wherein said fiber comprises a density of less than 0.25 non-conforming regions having a diameter of 25 microns or greater per millimeter of length along said fiber, each of said non-conforming regions being a region visible to the human eye under an optical microscope and having at least a portion thereof within a selected distance of said interface, said distance being less than or equal to said thickness of said polymer cladding, said optical microscope having a total magnification of about 200.

10. A method of delivering light to or from a work object, comprising:

provrding a source of optical energy;

providing an optical fiber comprising a glass core having a diameter of at least 250 microns and an index of refraction, a polymer cladding contactingly surrounding a glass portion of the optical fiber so as to form an interface between the polymer cladding and the glass portion, the polymer cladding comprising a first index of refraction that is less than the index of refraction, wherein the optical fiber comprises a density of less than 0.25 non-conforming regions having a diameter of 25 microns or greater per millimeter of length along the optical fiber, each of the non-conforming regions being a region visible to the human eye under a microscope and having at least a portion thereof within a selected distance of the interface, the distance being less than or equal to the thickness of the polymer cladding, the optical microscope having a magnification of about 200; and receiving with the optical fiber optical energy from the source and guiding the optical energy with the optical fiber, wherein the optical energy comprises at least one of 1) pulses each comprising a peak power of at least 10 kW, 2) an average power of at least 50 Watts, or 3) an average power density of at least 2.9 kW/cm$^2$.

11. The method of claim 10 wherein the optical energy comprises the pulses having a peak power of at least 10 kW.

12. The method of claim 10 wherein the optical energy comprises the average power of at least 50 Watts.

13. The method of claim 10 wherein the optical energy comprises the average power density of at least 2.9 kW.

14. The method of claim 10 wherein the density is less than 0.1 non-conforming regions per millimeter.

* * * * *